US009733625B2

(12) United States Patent
Kumar et al.

(10) Patent No.: US 9,733,625 B2
(45) Date of Patent: Aug. 15, 2017

(54) TRIP OPTIMIZATION SYSTEM AND METHOD FOR A TRAIN

(75) Inventors: Ajith Kuttannair Kumar, Erie, PA (US); Glenn Robert Shaffer, Erie, PA (US); Paul Kenneth Houpt, Schenectady, NY (US); Bernardo Adrian Movsichoff, Clifton Park, NY (US); David So Keung Chan, Niskayuna, NY (US); Sukru Alper Eker, Danbury, CT (US)

(73) Assignee: General Electric Company, Schenectady, NY (US)

( * ) Notice: Subject to any disclaimer, the term of this patent is extended or adjusted under 35 U.S.C. 154(b) by 201 days.

(21) Appl. No.: 11/385,354

(22) Filed: Mar. 20, 2006

(65) Prior Publication Data
US 2007/0219680 A1   Sep. 20, 2007

(51) Int. Cl.
*G05D 1/00*     (2006.01)
*G05B 13/02*    (2006.01)
(Continued)

(52) U.S. Cl.
CPC .......... *G05B 13/021* (2013.01); *B61L 3/006* (2013.01); *B61L 25/025* (2013.01); *B61L 25/026* (2013.01);
(Continued)

(58) Field of Classification Search
CPC ... G05B 13/021; B61L 25/025; B61L 25/026; B61L 27/0027; B61L 2205/04
(Continued)

(56) References Cited

U.S. PATENT DOCUMENTS

| 2,104,652 A | 1/1936 | Inman |
| 2,059,160 A | 10/1936 | Wintsch |

(Continued)

FOREIGN PATENT DOCUMENTS

| AU | 2007202928 A1 | 10/2007 |
| AU | 2010256020 A1 | 12/2011 |

(Continued)

OTHER PUBLICATIONS

Razouqi et al. Rynsord: A Novel, Decentralized Algorithm for Railway Networks with 'Soft Reservation', VTC, 1998, pp. 1585-2589, V3, New York, NY.

(Continued)

*Primary Examiner* — Redhwan K Mawari
*Assistant Examiner* — Rodney P King
(74) *Attorney, Agent, or Firm* — Global Patent Operation; John A. Kramer

(57) ABSTRACT

A system for operating a train having one or more locomotive consists with each locomotive consist comprising one or more locomotives, the system including a locator element to determine a location of the train, a track characterization element to provide information about a track, a sensor for measuring an operating condition of the locomotive consist, a processor operable to receive information from the locator element, the track characterizing element, and the sensor, and an algorithm embodied within the processor having access to the information to create a trip plan that optimizes performance of the locomotive consist in accordance with one or more operational criteria for the train.

28 Claims, 9 Drawing Sheets

(51) Int. Cl.
   *B61L 3/00*      (2006.01)
   *B61L 25/02*     (2006.01)
   *B61L 27/00*     (2006.01)

(52) U.S. Cl.
   CPC ........ *B61L 27/0027* (2013.01); *B61L 2205/04* (2013.01)

(58) Field of Classification Search
   USPC ....... 246/2 R, 122 R, 125, 167 R; 701/19, 1, 701/20, 22, 24, 102, 117, 119–121, 200, 701/204–209; 700/213–219
   See application file for complete search history.

(56) References Cited

U.S. PATENT DOCUMENTS

| | | |
|---|---|---|
| 2,104,601 A | 1/1938 | Young |
| 2,111,513 A | 3/1938 | Phinney |
| 2,148,005 A | 2/1939 | Allen et al. |
| 2,233,932 A | 3/1941 | Allen |
| 2,289,857 A | 7/1942 | Allen |
| 2,293,926 A | 8/1942 | Wallace |
| 2,366,802 A | 1/1945 | Pflasterer |
| 2,601,634 A | 6/1952 | Rovette |
| 2,628,335 A | 2/1953 | Drake |
| 2,783,369 A | 2/1957 | Weber |
| 2,925,552 A | 2/1960 | Cowan et al. |
| 2,927,711 A | 3/1960 | Naggiar |
| 3,016,464 A | 1/1962 | Bailey |
| 3,137,756 A | 6/1964 | Gunther et al. |
| 3,246,141 A | 4/1966 | Ehrlich |
| 3,393,600 A | 7/1968 | Bess |
| 3,508,496 A | 4/1970 | Larson |
| 3,517,307 A | 6/1970 | Wallen, Jr. et al. |
| 3,519,805 A | 7/1970 | Thorne-Booth |
| 3,537,401 A | 11/1970 | Metzner |
| 3,562,419 A | 2/1971 | Stewart et al. |
| 3,575,596 A | 4/1971 | Schatzel |
| 3,589,815 A | 6/1971 | Hosterman |
| 3,594,912 A | 7/1971 | Sauterel |
| 3,604,359 A | 9/1971 | Doorley et al. |
| 3,633,010 A | 1/1972 | Svetlichny |
| 3,650,216 A | 3/1972 | Harwick et al. |
| 3,655,962 A | 4/1972 | Koch |
| 3,696,243 A | 10/1972 | Risely |
| 3,718,040 A | 2/1973 | Freeman et al. |
| 3,781,139 A | 12/1973 | Lohse |
| 3,791,473 A | 2/1974 | Rosen |
| 3,794,833 A | 2/1974 | Blazek et al. |
| 3,805,056 A | 4/1974 | Birkin |
| 3,813,885 A | 6/1974 | Tabor |
| 3,821,558 A | 6/1974 | Mansfield |
| 3,821,932 A | 7/1974 | Theurer et al. |
| 3,828,440 A | 8/1974 | Plasser et al. |
| 3,850,390 A | 11/1974 | Geiger |
| 3,864,039 A | 2/1975 | Wilmarth |
| 3,865,042 A | 2/1975 | DePaola et al. |
| 3,870,952 A | 3/1975 | Sibley |
| 3,875,865 A | 4/1975 | Plasser et al. |
| 3,886,870 A | 6/1975 | Pelabon |
| 3,896,665 A | 7/1975 | Goel |
| 3,924,461 A | 12/1975 | Stover |
| 3,937,068 A | 2/1976 | Joy |
| 3,937,432 A | 2/1976 | Birkin |
| 3,948,314 A | 4/1976 | Creswick et al. |
| 3,960,005 A | 6/1976 | Vezina |
| 3,962,908 A | 6/1976 | Joy |
| 3,974,991 A | 8/1976 | Geiger |
| 3,987,989 A | 10/1976 | Geiger |
| 3,995,560 A | 12/1976 | Mackintosh |
| 4,003,019 A | 1/1977 | Tronel |
| 4,005,601 A | 2/1977 | Botello |
| 4,005,838 A | 2/1977 | Grundy |
| 4,022,408 A | 5/1977 | Staples |
| 4,040,738 A | 8/1977 | Wagner |
| 4,041,283 A | 8/1977 | Mosier |
| 4,042,810 A | 8/1977 | Mosher |
| 4,044,594 A | 8/1977 | Owens et al. |
| 4,062,419 A | 12/1977 | Kadota |
| 4,069,590 A | 1/1978 | Effinger |
| 4,075,632 A | 2/1978 | Baldwin et al. |
| 4,100,795 A | 7/1978 | Panetti |
| 4,117,463 A | 9/1978 | Norton |
| 4,117,529 A | 9/1978 | Stark et al. |
| 4,136,432 A | 1/1979 | Melley, Jr. |
| 4,143,553 A | 3/1979 | Martens et al. |
| 4,145,018 A | 3/1979 | Poggio et al. |
| 4,155,176 A | 5/1979 | Goel et al. |
| 4,159,088 A | 6/1979 | Cosley |
| 4,165,648 A | 8/1979 | Pagano |
| 4,173,073 A | 11/1979 | Fukazawa et al. |
| 4,174,636 A | 11/1979 | Pagano |
| 4,181,278 A | 1/1980 | Pascoe |
| 4,181,430 A | 1/1980 | Shirota et al. |
| 4,181,943 A | 1/1980 | Mercer, Sr. |
| 4,198,164 A | 4/1980 | Cantor |
| 4,207,569 A | 6/1980 | Meyer |
| 4,214,647 A | 7/1980 | Lutts |
| 4,222,275 A | 9/1980 | Sholl et al. |
| 4,229,978 A | 10/1980 | Sholl et al. |
| 4,235,112 A | 11/1980 | Kaiser |
| 4,241,403 A | 12/1980 | Schultz |
| 4,253,399 A | 3/1981 | Spigarelli |
| 4,259,018 A | 3/1981 | Poirier |
| 4,262,209 A | 4/1981 | Berner |
| 4,279,395 A | 7/1981 | Boggio et al. |
| 4,288,855 A | 9/1981 | Panetti |
| 4,306,694 A | 12/1981 | Kuhn |
| 4,324,376 A | 4/1982 | Kuhn |
| 4,344,364 A | 8/1982 | Nickles et al. |
| 4,355,582 A | 10/1982 | Germer |
| 4,360,873 A | 11/1982 | Wilde et al. |
| 4,361,202 A | 11/1982 | Minovitch |
| 4,383,448 A | 5/1983 | Fujimoto et al. |
| 4,389,033 A | 6/1983 | Hardman |
| 4,391,134 A | 7/1983 | Theurer et al. |
| 4,401,035 A | 8/1983 | Spigarelli et al. |
| 4,417,466 A | 11/1983 | Panetti |
| 4,417,522 A | 11/1983 | Theurer et al. |
| 4,425,097 A | 1/1984 | Owens |
| 4,429,576 A | 2/1984 | Norris |
| 4,430,615 A | 2/1984 | Calvert |
| 4,457,178 A | 7/1984 | Turbe et al. |
| 4,467,430 A | 8/1984 | Even et al. |
| 4,468,966 A | 9/1984 | Bradshaw |
| 4,487,071 A | 12/1984 | Pagano et al. |
| 4,490,038 A | 12/1984 | Theurer et al. |
| 4,524,745 A | 6/1985 | Tominari et al. |
| 4,531,837 A | 7/1985 | Panetti |
| 4,538,061 A | 8/1985 | Jaquet |
| 4,541,182 A | 9/1985 | Panetti |
| 4,548,070 A | 10/1985 | Panetti |
| 4,548,164 A | 10/1985 | Ylonen et al. |
| 4,561,057 A | 12/1985 | Haley, Jr. et al. |
| 4,565,548 A | 1/1986 | Davis et al. |
| 4,577,494 A | 3/1986 | Jaeggi |
| 4,578,665 A | 3/1986 | Yang |
| 4,582,280 A | 4/1986 | Nichols et al. |
| 4,582,580 A | 4/1986 | Goudal et al. |
| 4,593,569 A | 6/1986 | Joy |
| 4,602,335 A | 7/1986 | Perlmutter |
| 4,609,870 A | 9/1986 | Lale et al. |
| 4,615,218 A | 10/1986 | Pagano |
| 4,617,627 A | 10/1986 | Yasunobu et al. |
| 4,625,412 A | 12/1986 | Bradshaw |
| 4,644,705 A | 2/1987 | Saccomani et al. |
| 4,654,973 A | 4/1987 | Worthy |
| 4,655,142 A | 4/1987 | Theurer et al. |
| 4,662,224 A | 5/1987 | Turbe |
| 4,663,713 A | 5/1987 | Cornell et al. |
| 4,689,995 A | 9/1987 | Turbe |
| 4,691,565 A | 9/1987 | Theurer |
| 4,700,223 A | 10/1987 | Shoutaro et al. |
| 4,700,574 A | 10/1987 | Turbe |

(56) References Cited

U.S. PATENT DOCUMENTS

| | | | |
|---|---|---|---|
| 4,711,418 A | 12/1987 | Aver, Jr. et al. | |
| 4,718,351 A | 1/1988 | Engle | |
| 4,723,738 A | 2/1988 | Franke | |
| 4,728,063 A | 3/1988 | Petit et al. | |
| 4,735,384 A | 4/1988 | Elliott | |
| 4,735,385 A | 4/1988 | Nickles et al. | |
| 4,741,207 A | 5/1988 | Spangler | |
| 4,763,526 A | 8/1988 | Pagano | |
| 4,773,590 A | 9/1988 | Dash et al. | |
| 4,794,548 A | 12/1988 | Lynch et al. | |
| 4,827,438 A | 5/1989 | Nickles et al. | |
| 4,843,575 A | 6/1989 | Crane | |
| 4,853,883 A | 8/1989 | Nickles et al. | |
| 4,886,226 A | 12/1989 | Frielinghaus | |
| 4,915,504 A | 4/1990 | Thurston | |
| 4,932,614 A | 6/1990 | Birkin | |
| 4,932,618 A | 6/1990 | Davenport et al. | |
| 4,944,474 A | 7/1990 | Jones | |
| 4,979,392 A | 12/1990 | Guinon | |
| 4,986,498 A | 1/1991 | Rotter et al. | |
| 5,009,014 A | 4/1991 | Leach | |
| 5,036,594 A | 8/1991 | Kesler et al. | |
| 5,055,835 A | 10/1991 | Sutton | |
| 5,086,591 A | 2/1992 | Panetti | |
| 5,094,004 A | 3/1992 | Wooten | |
| 5,101,358 A | 3/1992 | Panetti | |
| 5,109,343 A | 4/1992 | Budway | |
| 5,129,605 A | 7/1992 | Burns et al. | |
| 5,133,645 A | 7/1992 | Crowley et al. | |
| 5,134,808 A | 8/1992 | Panetti | |
| 5,140,776 A | 8/1992 | Isdahl et al. | |
| 5,161,891 A | 11/1992 | Austill | |
| 5,177,684 A | 1/1993 | Harker et al. | |
| 5,181,541 A | 1/1993 | Bodenheimer | |
| 5,187,945 A | 2/1993 | Dixon | |
| 5,197,438 A | 3/1993 | Kumano et al. | |
| 5,197,627 A | 3/1993 | Disabato et al. | |
| 5,199,176 A | 4/1993 | Theurer et al. | |
| 5,201,294 A | 4/1993 | Osuka | |
| 5,203,089 A | 4/1993 | Trefouel et al. | |
| 5,230,613 A | 7/1993 | Hilsbos et al. | |
| 5,239,472 A | 8/1993 | Long et al. | |
| 5,240,416 A | 8/1993 | Bennington | |
| 5,253,153 A | 10/1993 | Mathews et al. | |
| 5,253,830 A | 10/1993 | Nayer et al. | |
| 5,261,366 A | 11/1993 | Regueiro | |
| 5,275,051 A | 1/1994 | De Beer | |
| 5,277,156 A | 1/1994 | Osuka et al. | |
| 5,301,548 A | 4/1994 | Theurer | |
| 5,313,924 A | 5/1994 | Regueiro | |
| 5,316,174 A | 5/1994 | Schutz | |
| 5,339,692 A | 8/1994 | Shoenhair et al. | |
| 5,341,683 A | 8/1994 | Searle | |
| 5,353,512 A | 10/1994 | Theurer et al. | |
| 5,357,912 A | 10/1994 | Barnes et al. | |
| 5,363,787 A | 11/1994 | Konopasek et al. | |
| 5,365,902 A | 11/1994 | Hsu | |
| 5,386,727 A | 2/1995 | Searle | |
| 5,388,034 A | 2/1995 | Allen et al. | |
| 5,394,851 A | 3/1995 | Cryer et al. | |
| 5,398,186 A | 3/1995 | Nakhla | |
| 5,398,894 A | 3/1995 | Pascoe | |
| 5,419,196 A | 5/1995 | Havira et al. | |
| 5,420,883 A | 5/1995 | Swensen et al. | |
| 5,429,329 A | 7/1995 | Wallace et al. | |
| 5,433,111 A | 7/1995 | Hershey et al. | |
| 5,433,182 A | 7/1995 | Augustin et al. | |
| 5,437,422 A | 8/1995 | Newman | |
| 5,440,489 A | 8/1995 | Newman | |
| 5,441,027 A | 8/1995 | Buchanon et al. | |
| 5,452,222 A | 9/1995 | Gray et al. | |
| 5,459,663 A | 10/1995 | Franke | |
| 5,459,666 A | 10/1995 | Casper et al. | |
| 5,460,013 A | 10/1995 | Thomsen | |
| 5,462,244 A | 10/1995 | Van Der Hoek et al. | |
| 5,475,597 A | 12/1995 | Buck | |
| 5,487,002 A | 1/1996 | Diller et al. | |
| 5,487,516 A | 1/1996 | Murata et al. | |
| 5,492,099 A | 2/1996 | Maddock | |
| 5,522,265 A | 6/1996 | Jaeggi | |
| 5,529,267 A | 6/1996 | Giras et al. | |
| 5,533,695 A | 7/1996 | Heggestad et al. | |
| 5,565,874 A | 10/1996 | Rode | |
| 5,570,284 A | 10/1996 | Roselli et al. | |
| 5,574,224 A | 11/1996 | Jaeggi | |
| 5,574,649 A | 11/1996 | Levy | |
| 5,574,659 A | 11/1996 | Delvers et al. | |
| 5,578,758 A | 11/1996 | Havira et al. | |
| 5,579,013 A | 11/1996 | Hershey et al. | |
| 5,583,769 A | 12/1996 | Saitoh | |
| 5,588,716 A | 12/1996 | Stumpe | |
| 5,598,782 A | 2/1997 | Wiseman et al. | |
| 5,600,558 A | 2/1997 | Mearek et al. | |
| 5,605,099 A | 2/1997 | Sroka et al. | |
| 5,605,134 A | 2/1997 | Martin | |
| 5,613,442 A | 3/1997 | Ahola et al. | |
| 5,618,179 A | 4/1997 | Copperman et al. | |
| 5,623,244 A | 4/1997 | Cooper | |
| 5,623,413 A | 4/1997 | Matheson et al. | |
| 5,627,508 A | 5/1997 | Cooper et al. | |
| 5,628,479 A | 5/1997 | Ballinger | |
| 5,636,026 A | 6/1997 | Mian et al. | |
| 5,642,827 A | 7/1997 | Madsen | |
| 5,651,330 A | 7/1997 | Jewett | |
| RE35,590 E | 8/1997 | Bezos et al. | |
| 5,676,059 A | 10/1997 | Alt | |
| 5,680,054 A | 10/1997 | Gauthier | |
| 5,681,015 A | 10/1997 | Kull | |
| 5,698,977 A | 12/1997 | Simpson et al. | |
| 5,699,986 A | 12/1997 | Welk | |
| 5,713,540 A | 2/1998 | Gerszberg et al. | |
| 5,719,771 A | 2/1998 | Buck et al. | |
| 5,720,455 A | 2/1998 | Kull et al. | |
| 5,721,685 A | 2/1998 | Holland et al. | |
| 5,735,492 A | 4/1998 | Pace | |
| 5,738,311 A | 4/1998 | Fernandez | |
| 5,740,547 A | 4/1998 | Kull et al. | |
| 5,743,495 A | 4/1998 | Welles, II et al. | |
| 5,744,707 A * | 4/1998 | Kull | 73/121 |
| 5,751,144 A | 5/1998 | Weischedel | |
| 5,755,349 A | 5/1998 | Brundle | |
| 5,756,903 A | 5/1998 | Norby et al. | |
| 5,758,299 A | 5/1998 | Sandborg et al. | |
| 5,769,364 A | 6/1998 | Cipollone | |
| 5,775,228 A | 7/1998 | Lamba et al. | |
| 5,777,891 A | 7/1998 | Pagano et al. | |
| 5,785,392 A | 7/1998 | Hart | |
| 5,786,535 A | 7/1998 | Takeuchi et al. | |
| 5,786,750 A | 7/1998 | Cooper | |
| 5,791,063 A | 8/1998 | Kesler et al. | |
| 5,794,172 A * | 8/1998 | Matheson et al. | 701/117 |
| 5,803,411 A | 9/1998 | Ackerman et al. | |
| 5,804,731 A | 9/1998 | Jaeggi | |
| 5,813,635 A | 9/1998 | Fernandez | |
| 5,817,934 A | 10/1998 | Skantar | |
| 5,820,226 A | 10/1998 | Hart | |
| 5,828,979 A * | 10/1998 | Polivka et al. | 701/117 |
| 5,832,895 A | 11/1998 | Takahashi et al. | |
| 5,833,325 A | 11/1998 | Hart | |
| 5,836,529 A | 11/1998 | Gibbs | |
| 5,856,802 A | 1/1999 | Ura et al. | |
| 5,867,404 A | 2/1999 | Bryan | |
| 5,913,170 A | 6/1999 | Wortham | |
| 5,924,654 A | 7/1999 | Anderson | |
| 5,927,822 A | 7/1999 | Hart | |
| 5,928,294 A | 7/1999 | Zelinkovsky | |
| 5,934,764 A | 8/1999 | Dimsa et al. | |
| 5,936,517 A | 8/1999 | Yeh | |
| 5,944,392 A | 8/1999 | Tachihata et al. | |
| 5,950,966 A | 9/1999 | Hungate et al. | |
| 5,950,967 A | 9/1999 | Montgomery | |
| 5,956,664 A | 9/1999 | Bryan | |
| 5,957,571 A | 9/1999 | Koster et al. | |
| 5,969,643 A | 10/1999 | Curtis | |

(56) References Cited

U.S. PATENT DOCUMENTS

| | | |
|---|---|---|
| 5,970,438 A | 10/1999 | Clark et al. |
| 5,978,718 A | 11/1999 | Kull |
| 5,983,144 A | 11/1999 | Bonissone et al. |
| 5,986,547 A | 11/1999 | Korver et al. |
| 5,986,577 A | 11/1999 | Bezos |
| 5,986,579 A | 11/1999 | Halvorson |
| 5,987,979 A | 11/1999 | Bryan |
| 5,992,241 A | 11/1999 | Posgay et al. |
| 5,995,737 A | 11/1999 | Bonissone et al. |
| 5,995,881 A | 11/1999 | Kull |
| 5,998,915 A | 12/1999 | Scholz et al. |
| 6,005,494 A | 12/1999 | Schramm |
| 6,016,791 A | 1/2000 | Thomas et al. |
| 6,026,687 A | 2/2000 | Jury |
| 6,055,862 A | 5/2000 | Martens |
| 6,064,428 A | 5/2000 | Trosino et al. |
| 6,067,496 A | 5/2000 | Benoliel et al. |
| 6,067,964 A | 5/2000 | Ruoff et al. |
| 6,081,769 A | 6/2000 | Curtis |
| 6,088,635 A | 7/2000 | Cox et al. |
| 6,092,021 A | 7/2000 | Ehlbeck et al. |
| 6,102,009 A | 8/2000 | Nishiyama |
| 6,102,340 A | 8/2000 | Peek et al. |
| 6,112,142 A | 8/2000 | Shockley et al. |
| 6,114,901 A | 9/2000 | Singh et al. |
| 6,114,974 A | 9/2000 | Halvorson |
| 6,119,353 A | 9/2000 | Gronskov |
| 6,121,924 A | 9/2000 | Meek et al. |
| 6,123,111 A | 9/2000 | Nathan et al. |
| 6,125,311 A | 9/2000 | Lo |
| 6,128,558 A | 10/2000 | Kernwein |
| 6,129,025 A | 10/2000 | Minakami et al. |
| 6,135,396 A | 10/2000 | Whitfield et al. |
| 6,144,901 A * | 11/2000 | Nickles et al. ................. 701/19 |
| 6,158,416 A | 12/2000 | Chen et al. |
| 6,158,822 A | 12/2000 | Shirai et al. |
| 6,163,089 A | 12/2000 | Kull |
| 6,163,755 A | 12/2000 | Peer et al. |
| 6,179,252 B1 | 1/2001 | Roop et al. |
| 6,192,863 B1 | 2/2001 | Takase |
| 6,195,020 B1 | 2/2001 | Brodeur, Sr. et al. |
| 6,198,993 B1 | 3/2001 | Higashi et al. |
| 6,216,095 B1 | 4/2001 | Glista |
| 6,216,957 B1 | 4/2001 | Turunen, Jr. |
| 6,219,595 B1 | 4/2001 | Nickles et al. |
| 6,225,919 B1 | 5/2001 | Lumbis et al. |
| 6,230,668 B1 | 5/2001 | Marsh et al. |
| 6,243,694 B1 | 6/2001 | Bonissone et al. |
| 6,262,573 B1 | 7/2001 | Wojnarowski et al. |
| 6,263,265 B1 | 7/2001 | Fera |
| 6,263,266 B1 | 7/2001 | Hawthorne |
| 6,269,034 B1 | 7/2001 | Shibuya |
| 6,270,040 B1 | 8/2001 | Katzer |
| 6,275,165 B1 | 8/2001 | Bezos |
| 6,286,480 B1 | 9/2001 | Chen et al. |
| 6,295,816 B1 | 10/2001 | Gallagher et al. |
| 6,304,801 B1 | 10/2001 | Doner |
| 6,308,117 B1 | 10/2001 | Ryland et al. |
| 6,317,686 B1 | 11/2001 | Ran |
| 6,322,025 B1 | 11/2001 | Colbert et al. |
| 6,324,912 B1 | 12/2001 | Wooh |
| 6,325,050 B1 | 12/2001 | Gallagher et al. |
| 6,332,106 B1 | 12/2001 | Hawthorne et al. |
| 6,347,265 B1 | 2/2002 | Bidaud |
| 6,349,653 B1 | 2/2002 | Siedlarczyk |
| 6,349,702 B1 | 2/2002 | Nishiyama |
| 6,349,706 B1 | 2/2002 | Hsu et al. |
| 6,357,421 B1 | 3/2002 | Pritchard |
| 6,360,998 B1 | 3/2002 | Halvorson et al. |
| 6,363,331 B1 | 3/2002 | Kyrtsos |
| 6,377,215 B1 | 4/2002 | Halvorson et al. |
| 6,380,639 B1 | 4/2002 | Soucy |
| 6,404,129 B1 | 6/2002 | Hendricx et al. |
| 6,405,141 B1 | 6/2002 | Carr et al. |
| 6,415,522 B1 | 7/2002 | Ganz |
| 6,416,020 B1 | 7/2002 | Gronskov |
| 6,417,765 B1 | 7/2002 | Capanna |
| 6,421,606 B1 | 7/2002 | Asai et al. |
| 6,427,114 B1 | 7/2002 | Olsson |
| 6,434,452 B1 | 8/2002 | Gray |
| 6,441,570 B1 | 8/2002 | Grubba et al. |
| 6,443,123 B1 | 9/2002 | Aoki et al. |
| 6,459,964 B1 | 10/2002 | Vu et al. |
| 6,459,965 B1 | 10/2002 | Polivka et al. |
| 6,484,074 B1 | 11/2002 | Hazard et al. |
| 6,487,478 B1 | 11/2002 | Azzaro et al. |
| 6,487,488 B1 | 11/2002 | Peterson, Jr. et al. |
| 6,490,523 B2 | 12/2002 | Doner |
| 6,493,627 B1 | 12/2002 | Gallagher et al. |
| 6,499,339 B1 | 12/2002 | Hedstrom |
| 6,499,815 B1 | 12/2002 | Daigle |
| 6,501,393 B1 | 12/2002 | Richards et al. |
| 6,505,103 B1 | 1/2003 | Howell et al. |
| 6,515,249 B1 | 2/2003 | Valley et al. |
| 6,516,668 B2 | 2/2003 | Havira et al. |
| 6,516,727 B2 | 2/2003 | Kraft |
| 6,520,124 B2 | 2/2003 | Bohm, II |
| 6,522,958 B1 | 2/2003 | Dwyer et al. |
| 6,523,787 B2 | 2/2003 | Braband |
| 6,525,658 B2 | 2/2003 | Streetman et al. |
| 6,533,223 B1 | 3/2003 | Ireland |
| 6,549,005 B1 | 4/2003 | Hay et al. |
| 6,549,803 B1 | 4/2003 | Raghavan et al. |
| 6,553,838 B2 | 4/2003 | Amini |
| 6,556,945 B1 | 4/2003 | Burggraf et al. |
| 6,557,526 B1 | 5/2003 | Hoshino |
| 6,564,172 B1 | 5/2003 | Till |
| 6,570,497 B2 | 5/2003 | Puckette, IV et al. |
| 6,571,636 B1 | 6/2003 | Mcwhorter |
| 6,584,953 B2 | 7/2003 | Yomogida |
| 6,585,085 B1 | 7/2003 | Kumar |
| 6,588,114 B1 | 7/2003 | Daigle |
| 6,591,263 B1 | 7/2003 | Becker et al. |
| 6,591,758 B2 | 7/2003 | Kumar |
| 6,604,421 B1 | 8/2003 | Li |
| 6,609,049 B1 | 8/2003 | Kane et al. |
| 6,612,245 B2 | 9/2003 | Kumar et al. |
| 6,612,246 B2 | 9/2003 | Kumar |
| 6,615,118 B2 | 9/2003 | Kumar |
| 6,615,188 B1 | 9/2003 | Breen et al. |
| 6,631,322 B1 | 10/2003 | Arthur et al. |
| 6,634,112 B2 | 10/2003 | Carr et al. |
| 6,647,328 B2 | 11/2003 | Walker |
| 6,647,891 B2 | 11/2003 | Holmes et al. |
| 6,676,089 B1 | 1/2004 | Katzer |
| 6,681,160 B2 | 1/2004 | Bidaud |
| 6,691,022 B2 | 2/2004 | Takemura et al. |
| 6,691,957 B2 | 2/2004 | Hess, Jr. et al. |
| 6,694,231 B1 | 2/2004 | Rezk |
| 6,698,913 B2 | 3/2004 | Yamamoto |
| 6,701,064 B1 | 3/2004 | De Haan et al. |
| 6,702,235 B2 | 3/2004 | Katzer |
| 6,712,045 B1 | 3/2004 | Mccarthy, Jr. |
| 6,725,782 B1 | 4/2004 | Bloom et al. |
| 6,728,515 B1 | 4/2004 | Wooh |
| 6,728,606 B2 | 4/2004 | Kumar |
| 6,728,625 B2 | 4/2004 | Strubhar et al. |
| 6,732,023 B2 | 5/2004 | Sugita et al. |
| 6,732,032 B1 | 5/2004 | Lowrey et al. |
| 6,742,392 B2 | 6/2004 | Gilmore et al. |
| 6,748,303 B2 | 6/2004 | Hawthorne |
| 6,748,313 B2 | 6/2004 | Li et al. |
| 6,763,291 B1 | 7/2004 | Houpt et al. |
| 6,778,284 B2 | 8/2004 | Casagrande |
| 6,782,044 B1 | 8/2004 | Wright et al. |
| 6,789,005 B2 | 9/2004 | Hawthorne |
| 6,804,621 B1 | 10/2004 | Pedanckar |
| 6,810,312 B2 | 10/2004 | Jammu et al. |
| 6,812,888 B2 | 11/2004 | Drury et al. |
| 6,814,050 B2 | 11/2004 | Kishibata et al. |
| 6,814,060 B1 | 11/2004 | Solomons et al. |
| 6,823,844 B2 | 11/2004 | Steinbrenner et al. |
| 6,824,110 B2 | 11/2004 | Kane et al. |
| 6,833,554 B2 | 12/2004 | Wooh |

(56) References Cited

U.S. PATENT DOCUMENTS

| | | |
|---|---|---|
| 6,845,953 B2 | 1/2005 | Kane et al. |
| 6,853,888 B2 | 2/2005 | Kane et al. |
| 6,853,890 B1 | 2/2005 | Horst et al. |
| 6,854,691 B2 | 2/2005 | Kraeling et al. |
| 6,856,865 B2 | 2/2005 | Hawthorne |
| 6,863,246 B2 | 3/2005 | Kane et al. |
| 6,865,454 B2 | 3/2005 | Kane et al. |
| 6,873,888 B2 | 3/2005 | Kumar |
| 6,893,262 B2 | 5/2005 | Stockman |
| 6,895,362 B2 | 5/2005 | Davenport et al. |
| 6,903,658 B2 | 6/2005 | Kane et al. |
| 6,910,792 B2 | 6/2005 | Takada et al. |
| 6,915,191 B2 | 7/2005 | Kane et al. |
| 6,922,619 B2 | 7/2005 | Baig et al. |
| 6,945,114 B2 | 9/2005 | Kenderian et al. |
| 6,947,830 B1 | 9/2005 | Froloff et al. |
| 6,948,837 B2 | 9/2005 | Suzuki |
| 6,951,132 B2 | 10/2005 | Davenport et al. |
| 6,953,272 B2 | 10/2005 | Hayakawa et al. |
| 6,957,131 B2 | 10/2005 | Kane et al. |
| 6,973,947 B2 | 12/2005 | Penaloza et al. |
| 6,976,324 B2 | 12/2005 | Theurer et al. |
| 6,978,195 B2 | 12/2005 | Kane et al. |
| 6,980,894 B1 | 12/2005 | Gordon et al. |
| 6,996,461 B2 | 2/2006 | Kane et al. |
| 7,007,561 B1 | 3/2006 | Otto et al. |
| 7,021,588 B2 | 4/2006 | Hess, Jr. et al. |
| 7,021,589 B2 | 4/2006 | Hess, Jr. et al. |
| 7,023,539 B2 | 4/2006 | Kowalski |
| 7,024,289 B2 | 4/2006 | Kane et al. |
| 7,031,823 B2 | 4/2006 | Chatfield et al. |
| 7,036,232 B2 | 5/2006 | Casagrande |
| 7,036,774 B2 | 5/2006 | Kane et al. |
| 7,047,130 B2 | 5/2006 | Watanabe et al. |
| 7,050,926 B2 | 5/2006 | Theurer et al. |
| 7,051,693 B2 | 5/2006 | Tetsuno et al. |
| 7,053,606 B2 | 5/2006 | Buttle et al. |
| 7,054,762 B2 | 5/2006 | Pagano et al. |
| 7,072,747 B2 | 7/2006 | Armbruster et al. |
| 7,072,757 B2 | 7/2006 | Adams et al. |
| 7,073,753 B2 | 7/2006 | Root et al. |
| 7,079,926 B2 | 7/2006 | Kane et al. |
| 7,081,824 B2 | 7/2006 | Gilbert |
| 7,082,881 B2 | 8/2006 | Schneider et al. |
| 7,082,924 B1 | 8/2006 | Ruedin |
| 7,092,800 B2 | 8/2006 | Kane et al. |
| 7,092,801 B2 | 8/2006 | Kane et al. |
| 7,092,894 B1 | 8/2006 | Crone |
| 7,096,171 B2 | 8/2006 | Hawthorne et al. |
| 7,127,336 B2 | 10/2006 | Houpt et al. |
| 7,131,403 B1 | 11/2006 | Banga et al. |
| 7,140,477 B2 | 11/2006 | Engle et al. |
| 7,152,330 B2 | 12/2006 | Kleeberg |
| 7,161,500 B2 | 1/2007 | Alfredsson et al. |
| 7,164,975 B2 | 1/2007 | Bidaud |
| 7,181,851 B2 | 2/2007 | Theurer et al. |
| 7,188,009 B2 | 3/2007 | Hawthorne |
| 7,197,932 B2 | 4/2007 | Sakai et al. |
| 7,200,536 B2 | 4/2007 | Wynn |
| 7,201,350 B2 | 4/2007 | Sugita et al. |
| 7,219,067 B1 | 5/2007 | Mcmullen et al. |
| 7,222,083 B2 | 5/2007 | Matheson et al. |
| 7,226,021 B1 | 6/2007 | Anderson et al. |
| 7,228,747 B2 | 6/2007 | Pieper |
| 7,234,449 B2 | 6/2007 | Casabianca et al. |
| 7,263,647 B2 | 8/2007 | Bryant et al. |
| 7,263,886 B2 | 9/2007 | Jury |
| 7,290,807 B2 | 11/2007 | Kumar |
| 7,296,770 B2 | 11/2007 | Franke |
| 7,302,895 B2 | 12/2007 | Kumar et al. |
| 7,305,885 B2 | 12/2007 | Barshinger et al. |
| 7,309,929 B2 | 12/2007 | Donnelly et al. |
| 7,312,607 B2 | 12/2007 | Nygaard |
| 7,337,766 B2 | 3/2008 | Nakayama et al. |
| 7,340,328 B2 | 3/2008 | Matheson et al. |
| 7,343,314 B2 | 3/2008 | Matheson et al. |
| 7,347,168 B2 | 3/2008 | Reckels et al. |
| 7,349,797 B2 | 3/2008 | Donnelly et al. |
| 7,387,029 B2 | 6/2008 | Cunningham |
| 7,389,694 B1 | 6/2008 | Hay et al. |
| 7,392,117 B1 | 6/2008 | Bilodeau et al. |
| 7,394,553 B2 | 7/2008 | Carr et al. |
| 7,395,141 B1 | 7/2008 | Seck et al. |
| 7,403,296 B2 | 7/2008 | Farritor et al. |
| 7,416,262 B2 | 8/2008 | Ring |
| 7,463,348 B2 | 12/2008 | Chung |
| 7,497,201 B2 | 3/2009 | Hollenbeck |
| 7,500,436 B2 | 3/2009 | Kumar et al. |
| 7,502,670 B2 | 3/2009 | Harrison |
| 7,509,193 B2 | 3/2009 | Kustosch |
| 7,520,415 B2 | 4/2009 | Kral et al. |
| 7,522,990 B2 | 4/2009 | Daum et al. |
| 7,523,893 B2 | 4/2009 | Francis et al. |
| 7,539,596 B2 | 5/2009 | Zoll et al. |
| 7,539,624 B2 | 5/2009 | Matheson et al. |
| 7,543,670 B2 | 6/2009 | Tamai et al. |
| 7,557,748 B1 | 7/2009 | Zahm et al. |
| 7,558,740 B2 | 7/2009 | Matheson et al. |
| 7,565,867 B2 | 7/2009 | Donnelly et al. |
| 7,575,201 B2 | 8/2009 | Bartonek |
| 7,618,011 B2 | 11/2009 | Oleski et al. |
| 7,659,972 B2 | 2/2010 | Magnus et al. |
| 7,667,611 B2 | 2/2010 | Lindsey et al. |
| 7,716,010 B2 | 5/2010 | Pelletier |
| 7,734,387 B1 | 6/2010 | Young et al. |
| 7,752,913 B2 | 7/2010 | Heckel et al. |
| 7,755,660 B2 | 7/2010 | Nejikovsky et al. |
| 7,770,847 B1 | 8/2010 | Severson |
| 7,778,747 B2 | 8/2010 | Hawkins et al. |
| 7,783,397 B2 | 8/2010 | Peltz et al. |
| 7,811,089 B2 | 10/2010 | Bond |
| 7,822,491 B2 | 10/2010 | Howlett et al. |
| 7,869,909 B2 | 1/2011 | Harrison |
| 7,872,736 B2 | 1/2011 | Rogers et al. |
| 7,882,742 B1 | 2/2011 | Martens |
| 7,895,135 B2 | 2/2011 | Norris et al. |
| 7,920,984 B2 | 4/2011 | Farritor |
| 7,937,246 B2 | 5/2011 | Farritor et al. |
| 7,938,370 B1 | 5/2011 | Lechevin et al. |
| 7,940,389 B2 | 5/2011 | Rogers et al. |
| 7,960,855 B2 | 6/2011 | King et al. |
| 8,020,446 B2 | 9/2011 | Bestebreurtje |
| 8,030,871 B1 | 10/2011 | Young et al. |
| 8,037,763 B2 | 10/2011 | Brignac et al. |
| 8,068,975 B2 | 11/2011 | Jensen et al. |
| 8,081,320 B2 | 12/2011 | Villar et al. |
| 8,125,219 B2 | 2/2012 | Jungbluth et al. |
| 8,126,601 B2 | 2/2012 | Kapp et al. |
| 8,150,568 B1 | 4/2012 | Gray |
| 8,154,227 B1 | 4/2012 | Young et al. |
| 8,155,811 B2 | 4/2012 | Noffsinger et al. |
| 8,157,218 B2 | 4/2012 | Riley et al. |
| 8,157,219 B2 | 4/2012 | Ashraf et al. |
| 8,160,832 B2 | 4/2012 | Luo et al. |
| 8,195,364 B2 | 6/2012 | Norris et al. |
| 8,264,330 B2 | 9/2012 | Yeldell et al. |
| 8,266,092 B2 | 9/2012 | Kuhn et al. |
| 8,305,567 B2 | 11/2012 | Hesser et al. |
| 8,428,798 B2 | 4/2013 | Kull |
| 8,521,345 B2 | 8/2013 | Cooper et al. |
| 8,532,842 B2 | 9/2013 | Smith et al. |
| 8,626,366 B2 | 1/2014 | Noffsinger et al. |
| 8,645,047 B2 | 2/2014 | Daum et al. |
| 8,655,518 B2 | 2/2014 | Cooper et al. |
| 8,655,519 B2 | 2/2014 | Cooper et al. |
| 8,682,514 B2 | 3/2014 | Falk et al. |
| 9,108,640 B2 | 8/2015 | Jackson |
| 2001/0001131 A1 | 5/2001 | Miller |
| 2001/0019263 A1 | 9/2001 | Kwun et al. |
| 2001/0026321 A1 | 10/2001 | Goto |
| 2001/0029411 A1 | 10/2001 | Hawthorne |
| 2001/0045495 A1 | 11/2001 | Olson et al. |
| 2001/0047241 A1* | 11/2001 | Khavakh et al. ............ 701/209 |
| 2002/0010531 A1 | 1/2002 | Hawthorne et al. |

(56) References Cited

U.S. PATENT DOCUMENTS

| | | |
|---|---|---|
| 2002/0059075 A1 | 5/2002 | Schick et al. |
| 2002/0062819 A1 | 5/2002 | Takahashi |
| 2002/0065698 A1 | 5/2002 | Schick et al. |
| 2002/0072833 A1 | 6/2002 | Gray |
| 2002/0093201 A1 | 7/2002 | Soucy |
| 2002/0096081 A1 | 7/2002 | Kraft |
| 2002/0103585 A1 | 8/2002 | Biess et al. |
| 2002/0104779 A1 | 8/2002 | Connor et al. |
| 2002/0107618 A1* | 8/2002 | Deguchi et al. ............... 701/22 |
| 2002/0113170 A1 | 8/2002 | Grappone |
| 2002/0148931 A1 | 10/2002 | Anderson |
| 2002/0157901 A1 | 10/2002 | Kast et al. |
| 2002/0174653 A1 | 11/2002 | Uzkan |
| 2002/0188397 A1 | 12/2002 | Biess et al. |
| 2002/0195086 A1 | 12/2002 | Beck et al. |
| 2003/0000499 A1 | 1/2003 | Doelker et al. |
| 2003/0001050 A1 | 1/2003 | Katzer |
| 2003/0010872 A1 | 1/2003 | Lewin et al. |
| 2003/0020469 A1 | 1/2003 | Katragadda et al. |
| 2003/0034423 A1 | 2/2003 | Hess et al. |
| 2003/0038216 A1 | 2/2003 | Holgate |
| 2003/0055666 A1 | 3/2003 | Roddy et al. |
| 2003/0060968 A1 | 3/2003 | MacPhail et al. |
| 2003/0070492 A1 | 4/2003 | Buttle et al. |
| 2003/0076221 A1 | 4/2003 | Akiyama et al. |
| 2003/0091017 A1* | 5/2003 | Davenport et al. ............ 370/338 |
| 2003/0104899 A1 | 6/2003 | Keller |
| 2003/0105561 A1 | 6/2003 | Nickles et al. |
| 2003/0107548 A1 | 6/2003 | Eun et al. |
| 2003/0120400 A1 | 6/2003 | Ahmed et al. |
| 2003/0128030 A1 | 7/2003 | Hintze et al. |
| 2003/0139909 A1 | 7/2003 | Ozawa |
| 2003/0158640 A1 | 8/2003 | Pillar et al. |
| 2003/0183729 A1 | 10/2003 | Root et al. |
| 2003/0187694 A1 | 10/2003 | Rowen |
| 2003/0213875 A1 | 11/2003 | Hess, Jr. et al. |
| 2003/0214417 A1 | 11/2003 | Peltz et al. |
| 2003/0222981 A1 | 12/2003 | Kisak et al. |
| 2003/0229097 A1 | 12/2003 | Watkins et al. |
| 2003/0229446 A1* | 12/2003 | Boscamp et al. ............. 701/213 |
| 2003/0233959 A1 | 12/2003 | Kumar |
| 2003/0236598 A1 | 12/2003 | Villarreal et al. |
| 2004/0010432 A1 | 1/2004 | Matheson et al. |
| 2004/0024515 A1 | 2/2004 | Troupe et al. |
| 2004/0024518 A1 | 2/2004 | Boley et al. |
| 2004/0025849 A1 | 2/2004 | West et al. |
| 2004/0026574 A1 | 2/2004 | Seifert |
| 2004/0034556 A1 | 2/2004 | Matheson et al. |
| 2004/0038831 A1 | 2/2004 | Eadie |
| 2004/0048620 A1 | 3/2004 | Nakahara et al. |
| 2004/0049339 A1 | 3/2004 | Kober et al. |
| 2004/0068359 A1 | 4/2004 | Neiss et al. |
| 2004/0073361 A1 | 4/2004 | Tzamaloukas et al. |
| 2004/0075280 A1 | 4/2004 | Kumar et al. |
| 2004/0093245 A1 | 5/2004 | Matheson et al. |
| 2004/0095135 A1 | 5/2004 | Nejikovsky et al. |
| 2004/0098142 A1 | 5/2004 | Warren et al. |
| 2004/0104312 A1 | 6/2004 | Hess et al. |
| 2004/0107042 A1 | 6/2004 | Seick |
| 2004/0108814 A1 | 6/2004 | Tsuda et al. |
| 2004/0111309 A1 | 6/2004 | Matheson et al. |
| 2004/0122569 A1 | 6/2004 | Bidaud |
| 2004/0129289 A1 | 7/2004 | Hafemann |
| 2004/0129840 A1* | 7/2004 | Horst ............................ 246/186 |
| 2004/0133315 A1 | 7/2004 | Kumar et al. |
| 2004/0143374 A1 | 7/2004 | Horst et al. |
| 2004/0167687 A1 | 8/2004 | Kornick et al. |
| 2004/0172175 A1* | 9/2004 | Julich et al. .................... 701/19 |
| 2004/0174121 A1 | 9/2004 | Tsuda et al. |
| 2004/0238693 A1 | 12/2004 | Cole |
| 2004/0243664 A1 | 12/2004 | Horstemeyer |
| 2004/0245410 A1* | 12/2004 | Kisak et al. ....................... 246/3 |
| 2004/0249571 A1 | 12/2004 | Blesener et al. |
| 2005/0004723 A1 | 1/2005 | Duggan et al. |
| 2005/0007020 A1 | 1/2005 | Tsuda et al. |
| 2005/0045058 A1 | 3/2005 | Donnelly et al. |
| 2005/0055157 A1 | 3/2005 | Scholl |
| 2005/0055287 A1* | 3/2005 | Schmidtberg et al. ......... 705/28 |
| 2005/0065674 A1* | 3/2005 | Houpt et al. .................... 701/19 |
| 2005/0065711 A1 | 3/2005 | Dahlgren et al. |
| 2005/0076716 A1 | 4/2005 | Turner |
| 2005/0085961 A1 | 4/2005 | Kane et al. |
| 2005/0090978 A1 | 4/2005 | Bathory et al. |
| 2005/0096797 A1 | 5/2005 | Matsubara et al. |
| 2005/0099323 A1 | 5/2005 | Hirose |
| 2005/0107954 A1* | 5/2005 | Nahla ........................... 701/301 |
| 2005/0109882 A1 | 5/2005 | Armbruster et al. |
| 2005/0120904 A1 | 6/2005 | Kumar et al. |
| 2005/0121005 A1 | 6/2005 | Edwards |
| 2005/0121971 A1 | 6/2005 | Ring |
| 2005/0171655 A1 | 8/2005 | Flynn et al. |
| 2005/0171657 A1 | 8/2005 | Kumar |
| 2005/0186325 A1 | 8/2005 | Luangthep |
| 2005/0188745 A1 | 9/2005 | Staphanos et al. |
| 2005/0189815 A1 | 9/2005 | Bryant |
| 2005/0189886 A1 | 9/2005 | Donnelly et al. |
| 2005/0192720 A1 | 9/2005 | Christie et al. |
| 2005/0196737 A1 | 9/2005 | Mann |
| 2005/0205719 A1 | 9/2005 | Hendrickson et al. |
| 2005/0210304 A1 | 9/2005 | Hartung et al. |
| 2005/0229604 A1 | 10/2005 | Chen |
| 2005/0234757 A1 | 10/2005 | Matheson et al. |
| 2005/0251299 A1 | 11/2005 | Donnelly et al. |
| 2005/0253397 A1 | 11/2005 | Kumar et al. |
| 2005/0285552 A1 | 12/2005 | Grubba et al. |
| 2005/0288832 A1 | 12/2005 | Smith et al. |
| 2006/0005736 A1 | 1/2006 | Kumar |
| 2006/0017911 A1 | 1/2006 | Villar et al. |
| 2006/0025903 A1 | 2/2006 | Kumar |
| 2006/0030978 A1 | 2/2006 | Rajaram |
| 2006/0041341 A1 | 2/2006 | Kane et al. |
| 2006/0047379 A1* | 3/2006 | Schullian et al. ............... 701/19 |
| 2006/0055175 A1 | 3/2006 | Grinblat |
| 2006/0060345 A1 | 3/2006 | Flik et al. |
| 2006/0076461 A1 | 4/2006 | Derose et al. |
| 2006/0085103 A1 | 4/2006 | Smith et al. |
| 2006/0085363 A1 | 4/2006 | Cheng et al. |
| 2006/0086546 A1 | 4/2006 | Hu et al. |
| 2006/0098843 A1 | 5/2006 | Chew |
| 2006/0116789 A1 | 6/2006 | Subramanian |
| 2006/0116795 A1 | 6/2006 | Abe et al. |
| 2006/0122737 A1 | 6/2006 | Tani et al. |
| 2006/0155434 A1 | 7/2006 | Kane et al. |
| 2006/0162973 A1 | 7/2006 | Harris et al. |
| 2006/0178800 A1 | 8/2006 | Chen et al. |
| 2006/0187086 A1 | 8/2006 | Quintos |
| 2006/0212188 A1 | 9/2006 | Kickbusch et al. |
| 2006/0212189 A1 | 9/2006 | Kickbusch et al. |
| 2006/0219214 A1 | 10/2006 | Okude et al. |
| 2006/0225710 A1 | 10/2006 | Taglialatela-Scafati et al. |
| 2006/0231066 A1 | 10/2006 | Demura et al. |
| 2006/0235584 A1 | 10/2006 | Fregene et al. |
| 2006/0235604 A1 | 10/2006 | Taglialatela-Scafati et al. |
| 2006/0253233 A1 | 11/2006 | Metzger |
| 2006/0271291 A1 | 11/2006 | Meyer |
| 2006/0277906 A1 | 12/2006 | Burk et al. |
| 2006/0282199 A1 | 12/2006 | Daum et al. |
| 2007/0006831 A1 | 1/2007 | Leone et al. |
| 2007/0061053 A1 | 3/2007 | Zeitzew |
| 2007/0062476 A1 | 3/2007 | Ota et al. |
| 2007/0073466 A1 | 3/2007 | Tamai et al. |
| 2007/0078026 A1 | 4/2007 | Holt et al. |
| 2007/0093148 A1 | 4/2007 | Gibbs et al. |
| 2007/0108308 A1 | 5/2007 | Keightley |
| 2007/0112475 A1 | 5/2007 | Koebler et al. |
| 2007/0129852 A1 | 6/2007 | Chen et al. |
| 2007/0132463 A1 | 6/2007 | Anderson |
| 2007/0135988 A1 | 6/2007 | Kidston et al. |
| 2007/0137514 A1 | 6/2007 | Kumar et al. |
| 2007/0163352 A1 | 7/2007 | Nielsen et al. |
| 2007/0183039 A1 | 8/2007 | Irvin |
| 2007/0209619 A1 | 9/2007 | Leone |
| 2007/0217670 A1 | 9/2007 | Bar Am |
| 2007/0219680 A1 | 9/2007 | Kumar et al. |

(56) References Cited

U.S. PATENT DOCUMENTS

| | | |
|---|---|---|
| 2007/0219681 A1 | 9/2007 | Kumar et al. |
| 2007/0219682 A1 | 9/2007 | Kumar et al. |
| 2007/0219683 A1 | 9/2007 | Daum et al. |
| 2007/0225878 A1 | 9/2007 | Kumar et al. |
| 2007/0233335 A1 | 10/2007 | Kumar et al. |
| 2007/0233364 A1 | 10/2007 | Kumar |
| 2007/0241237 A1 | 10/2007 | Foy et al. |
| 2007/0250225 A1 | 10/2007 | Nickles et al. |
| 2007/0250255 A1 | 10/2007 | Matekunas et al. |
| 2007/0260367 A1 | 11/2007 | Wills et al. |
| 2007/0260369 A1 | 11/2007 | Philp et al. |
| 2007/0261648 A1 | 11/2007 | Reckels et al. |
| 2007/0274158 A1 | 11/2007 | Agam et al. |
| 2008/0004721 A1 | 1/2008 | Huff et al. |
| 2008/0010571 A1 | 1/2008 | Farnsworth et al. |
| 2008/0041267 A1 | 2/2008 | Denen et al. |
| 2008/0065282 A1 | 3/2008 | Daum et al. |
| 2008/0091334 A1 | 4/2008 | Carlson et al. |
| 2008/0109124 A1 | 5/2008 | Daum et al. |
| 2008/0110249 A1 | 5/2008 | Degeorge et al. |
| 2008/0125924 A1 | 5/2008 | Daum et al. |
| 2008/0128563 A1 | 6/2008 | Kumar et al. |
| 2008/0142645 A1 | 6/2008 | Tomlinson et al. |
| 2008/0147256 A1 | 6/2008 | Liberatore |
| 2008/0161984 A1 | 7/2008 | Hrdlicka et al. |
| 2008/0164078 A1 | 7/2008 | Rhodes et al. |
| 2008/0183345 A1 | 7/2008 | Chandra et al. |
| 2008/0183490 A1 | 7/2008 | Martin et al. |
| 2008/0201019 A1 | 8/2008 | Kumar et al. |
| 2008/0201028 A1 | 8/2008 | Brooks et al. |
| 2008/0201056 A1 | 8/2008 | Moriya |
| 2008/0201089 A1 | 8/2008 | Diaz et al. |
| 2008/0208393 A1 | 8/2008 | Schricker |
| 2008/0296441 A1 | 12/2008 | Anderson et al. |
| 2008/0312775 A1 | 12/2008 | Kumar |
| 2009/0044530 A1 | 2/2009 | Gallagher et al. |
| 2009/0063045 A1 | 3/2009 | Figueroa et al. |
| 2009/0076664 A1 | 3/2009 | Mccabe et al. |
| 2009/0078236 A1 | 3/2009 | Gallagher et al. |
| 2009/0132179 A1 | 5/2009 | Fu et al. |
| 2009/0140574 A1 | 6/2009 | Gorman et al. |
| 2009/0159046 A1 | 6/2009 | Moriya |
| 2009/0164104 A1 | 6/2009 | Wermuth et al. |
| 2009/0177345 A1 | 7/2009 | Severinsky et al. |
| 2009/0186325 A1 | 7/2009 | Kumar |
| 2009/0187291 A1 | 7/2009 | Daum et al. |
| 2009/0193899 A1 | 8/2009 | Panetta et al. |
| 2009/0198391 A1 | 8/2009 | Kumar et al. |
| 2009/0205028 A1 | 8/2009 | Smeets et al. |
| 2009/0241909 A1 | 10/2009 | Smith |
| 2009/0248220 A1 | 10/2009 | Ecton et al. |
| 2009/0254239 A1 | 10/2009 | Daum et al. |
| 2009/0266166 A1 | 10/2009 | Pagano |
| 2009/0266943 A1 | 10/2009 | Kumar et al. |
| 2009/0282923 A1 | 11/2009 | Havira |
| 2009/0299555 A1 | 12/2009 | Houpt et al. |
| 2009/0319092 A1 | 12/2009 | Piche |
| 2010/0023190 A1 | 1/2010 | Kumar et al. |
| 2010/0023240 A1 | 1/2010 | Haskara et al. |
| 2010/0049384 A1 | 2/2010 | Kraeling et al. |
| 2010/0049408 A1 | 2/2010 | Abadie et al. |
| 2010/0084916 A1 | 4/2010 | Kumar et al. |
| 2010/0114404 A1 | 5/2010 | Donnelly |
| 2010/0130124 A1 | 5/2010 | Teeter et al. |
| 2010/0131130 A1 | 5/2010 | Kalyanam et al. |
| 2010/0152998 A1 | 6/2010 | Schwarzmann |
| 2010/0174427 A1 | 7/2010 | Sivasubramaniam et al. |
| 2010/0207620 A1 | 8/2010 | Gies |
| 2010/0235022 A1 | 9/2010 | Siddappa et al. |
| 2010/0262321 A1 | 10/2010 | Daum et al. |
| 2010/0312493 A1 | 12/2010 | Purekar et al. |
| 2010/0318247 A1 | 12/2010 | Kumar |
| 2010/0332058 A1 | 12/2010 | Kane et al. |
| 2011/0006167 A1 | 1/2011 | Tolmei |
| 2011/0029243 A1 | 2/2011 | Gallagher et al. |
| 2011/0035138 A1 | 2/2011 | Kickbusch et al. |
| 2011/0060486 A1 | 3/2011 | Meltser et al. |
| 2011/0093144 A1 | 4/2011 | Goodermuth et al. |
| 2011/0118899 A1 | 5/2011 | Brooks et al. |
| 2011/0199607 A1 | 8/2011 | Kanellopoulos et al. |
| 2011/0216996 A1 | 9/2011 | Rogers |
| 2011/0233293 A1 | 9/2011 | Kral et al. |
| 2011/0255077 A1 | 10/2011 | Rogers |
| 2011/0257869 A1 | 10/2011 | Kumar et al. |
| 2011/0276203 A1 | 11/2011 | Hase |
| 2011/0284700 A1 | 11/2011 | Brand et al. |
| 2011/0307113 A1 | 12/2011 | Kumar et al. |
| 2012/0022728 A1 | 1/2012 | Hall et al. |
| 2012/0108204 A1 | 5/2012 | Schell et al. |
| 2012/0108205 A1 | 5/2012 | Schell et al. |
| 2012/0108207 A1 | 5/2012 | Schell et al. |
| 2012/0135710 A1 | 5/2012 | Schell et al. |
| 2012/0197504 A1 | 8/2012 | Sujan et al. |
| 2012/0217351 A1 | 8/2012 | Chadwick et al. |
| 2012/0245766 A1 | 9/2012 | Cooper et al. |
| 2012/0245770 A1 | 9/2012 | Yamamoto et al. |
| 2012/0259531 A1 | 10/2012 | Daum et al. |
| 2012/0277940 A1 | 11/2012 | Kumar et al. |
| 2012/0290185 A1 | 11/2012 | Cooper et al. |
| 2012/0296545 A1 | 11/2012 | Cooper et al. |
| 2012/0316717 A1 | 12/2012 | Daum et al. |
| 2013/0015298 A1 | 1/2013 | Cooper et al. |
| 2013/0035811 A1 | 2/2013 | Schroeck et al. |
| 2013/0062474 A1 | 3/2013 | Baldwin et al. |
| 2013/0131898 A1 | 5/2013 | Kumar et al. |
| 2013/0131909 A1 | 5/2013 | Cooper et al. |
| 2013/0169037 A1 | 7/2013 | Bieg et al. |
| 2013/0171590 A1 | 7/2013 | Kumar |
| 2013/0173083 A1 | 7/2013 | Cooper et al. |
| 2013/0261837 A1 | 10/2013 | Sharma et al. |
| 2013/0261856 A1 | 10/2013 | Sharma et al. |
| 2013/0284859 A1 | 10/2013 | Polivka et al. |
| 2013/0334373 A1 | 12/2013 | Malone, Jr. et al. |
| 2014/0094998 A1 | 4/2014 | Cooper et al. |
| 2014/0125356 A1 | 5/2014 | Cooper et al. |
| 2014/0129154 A1 | 5/2014 | Cooper et al. |
| 2014/0138493 A1 | 5/2014 | Noffsinger et al. |
| 2014/0156123 A1 | 6/2014 | Cooper et al. |
| 2014/0277824 A1 | 9/2014 | Kernwein et al. |
| 2014/0280899 A1 | 9/2014 | Brewster, Jr. et al. |
| 2015/0009331 A1 | 1/2015 | Venkatraman |
| 2015/0053827 A1 | 2/2015 | Noffsinger et al. |
| 2015/0183448 A1 | 7/2015 | Cooper et al. |

FOREIGN PATENT DOCUMENTS

| | | |
|---|---|---|
| CA | 1065039 A | 10/1979 |
| CA | 2 192 151 A | 8/1997 |
| CA | 2466540 A1 | 11/2004 |
| CA | 2627074 A1 | 5/2007 |
| CH | 642418 A5 | 4/1984 |
| CN | 1511744 A | 7/2004 |
| CN | 1528631 A | 9/2004 |
| CN | 1636814 A | 7/2005 |
| CN | 1683914 A | 10/2005 |
| CN | 1819942 A | 8/2006 |
| CN | 1906074 A | 1/2007 |
| CN | 1958363 A | 5/2007 |
| CN | 101351373 A | 1/2009 |
| CN | 101412377 A | 4/2009 |
| CN | 102556118 B | 6/2014 |
| DE | A 1 605 862 | 5/1971 |
| DE | 129 761 A | 2/1978 |
| DE | 208 324 A | 5/1984 |
| DE | 3538165 A1 | 4/1987 |
| DE | 255 132 A | 3/1988 |
| DE | 4225800 C1 | 11/1993 |
| DE | 196 45 426 | 5/1997 |
| DE | 19654960 A1 | 7/1998 |
| DE | 19731643 A1 | 9/1998 |
| DE | 197 26 542 | 11/1998 |
| DE | 19830053 C1 | 11/1999 |
| DE | 19826764 A1 | 12/1999 |
| DE | 199 35 349 | 2/2001 |

(56) References Cited

FOREIGN PATENT DOCUMENTS

| | | |
|---|---|---|
| DE | 199 35 352 | 2/2001 |
| DE | 199 35 353 | 2/2001 |
| DE | 100 45 921 | 3/2002 |
| DE | 10226143 B4 | 2/2006 |
| DE | 102005051077 A1 | 4/2007 |
| DE | 202010006811 U1 | 7/2010 |
| DE | 102010026433 A1 | 1/2012 |
| DE | 102010045234 A1 | 3/2012 |
| EP | 88716 A2 | 9/1983 |
| EP | 0 114 633 | 8/1984 |
| EP | 0 257 662 | 3/1988 |
| EP | 0 341 826 A | 11/1989 |
| EP | 0 428 113 | 5/1991 |
| EP | 0 445 047 | 9/1991 |
| EP | 0 485 978 | 5/1992 |
| EP | 0 539 885 | 5/1993 |
| EP | 0 554 983 | 8/1993 |
| EP | 0 594 226 | 4/1994 |
| EP | 644098 A2 | 3/1995 |
| EP | 719690 A2 | 7/1996 |
| EP | 755 840 A | 1/1997 |
| EP | 467 377 B | 6/1997 |
| EP | 0 958 987 | 11/1999 |
| EP | 1012019 | 6/2000 |
| EP | 1034984 A2 | 9/2000 |
| EP | 1 136 969 | 9/2001 |
| EP | 1143140 A1 | 10/2001 |
| EP | 1 253 059 | 10/2002 |
| EP | 1 293 948 A | 3/2003 |
| EP | 1 297 982 | 4/2003 |
| EP | 1348854 A1 | 10/2003 |
| EP | 1 466 803 | 10/2004 |
| EP | 1 564 395 | 8/2005 |
| EP | 1562321 A2 | 8/2005 |
| EP | 1564395 | 8/2005 |
| EP | 1566533 A1 | 8/2005 |
| EP | 1697196 | 9/2006 |
| EP | 1754644 A1 | 2/2007 |
| EP | 1 816 332 | 8/2007 |
| FR | 2 129 215 | 10/1972 |
| FR | 2 558 806 | 8/1985 |
| FR | 2 767 770 | 3/1999 |
| GB | 482 625 | 12/1936 |
| GB | 1 321 053 | 6/1973 |
| GB | 1 321 054 | 6/1973 |
| GB | 2 188 464 A | 9/1987 |
| GB | 2371121 A | 7/2002 |
| JP | 52121192 A | 10/1977 |
| JP | 60 028153 | 2/1985 |
| JP | 63268405 A | 11/1988 |
| JP | 11002558 A | 4/1989 |
| JP | 05077734 | 3/1993 |
| JP | 5238392 A | 9/1993 |
| JP | 5278615 A | 10/1993 |
| JP | 6108869 A | 4/1994 |
| JP | 06153327 | 5/1994 |
| JP | 7132832 A | 5/1995 |
| JP | 08-198102 | 8/1996 |
| JP | 09076913 | 3/1997 |
| JP | 9193804 A | 7/1997 |
| JP | 9200910 A | 7/1997 |
| JP | 10-505036 | 5/1998 |
| JP | 10274075 A | 10/1998 |
| JP | 2858529 B2 | 2/1999 |
| JP | 2001-065360 | 3/2001 |
| JP | 32 13459 | 10/2001 |
| JP | 2002204507 A | 7/2002 |
| JP | 2002249049 A | 9/2002 |
| JP | 2002294609 A | 10/2002 |
| JP | 2003095109 A | 4/2003 |
| JP | 2004301080 A | 10/2004 |
| JP | 2004328993 A | 11/2004 |
| JP | 2005-002802 | 1/2005 |
| JP | 2005-232990 | 9/2005 |
| JP | 2005-343294 | 12/2005 |
| JP | 2006219051 A | 8/2006 |
| JP | 2006-320139 | 11/2006 |
| JP | 2006-327551 | 12/2006 |
| JP | 2008535871 | 9/2008 |
| JP | 2009095094 A | 4/2009 |
| JP | 50-32733 | 9/2012 |
| JP | 5061347 | 10/2012 |
| KZ | 386 U | 8/2008 |
| RU | 2115140 C1 | 7/1998 |
| RU | 2207279 C1 | 6/2003 |
| RU | 2213669 C1 | 10/2003 |
| RU | 2233011 C2 | 7/2004 |
| RU | 2237589 C1 | 10/2004 |
| RU | 2238860 C1 | 10/2004 |
| RU | 2238869 C1 | 10/2004 |
| RU | 2242392 C2 | 12/2004 |
| RU | 2265539 C2 | 12/2005 |
| RU | 2272731 C2 | 3/2006 |
| RU | 2273567 C1 | 4/2006 |
| RU | 2286279 C2 | 10/2006 |
| RU | 2299144 C2 | 5/2007 |
| RU | 2320498 C1 | 3/2008 |
| RU | 83221 U1 | 5/2009 |
| SU | 568241 A1 | 12/1981 |
| WO | WO 90/03622 | 4/1990 |
| WO | WO 95/25053 | 9/1995 |
| WO | 199601431 A1 | 1/1996 |
| WO | WO 96/06766 | 3/1996 |
| WO | 9858829 A1 | 12/1998 |
| WO | WO 99/14093 | 3/1999 |
| WO | WO9914090 | 3/1999 |
| WO | 9960735 A1 | 11/1999 |
| WO | 0009377 A1 | 2/2000 |
| WO | 0186139 A1 | 11/2001 |
| WO | 0230729 A1 | 4/2002 |
| WO | 2002060738 A1 | 8/2002 |
| WO | WO 03/097424 | 11/2003 |
| WO | WO 2004/023517 | 3/2004 |
| WO | 2004039621 A1 | 5/2004 |
| WO | WO 2004/051699 | 6/2004 |
| WO | WO 2004/051700 | 6/2004 |
| WO | WO 2004/052755 | 6/2004 |
| WO | 2004059446 A2 | 7/2004 |
| WO | 2005028837 A2 | 3/2005 |
| WO | WO 2005/061300 | 7/2005 |
| WO | WO 2006/049252 | 5/2006 |
| WO | 2006065730 A2 | 6/2006 |
| WO | 2006133306 A1 | 12/2006 |
| WO | WO 2007/027130 | 3/2007 |
| WO | WO 2007/091270 | 8/2007 |
| WO | 2007110613 A1 | 10/2007 |
| WO | 2007116123 A1 | 10/2007 |
| WO | WO 2007/111768 | 10/2007 |
| WO | 2008012535 A2 | 1/2008 |
| WO | 2008065032 A1 | 6/2008 |
| WO | 2008073547 A2 | 6/2008 |
| WO | 2008099177 A1 | 8/2008 |
| WO | 2009087385 A2 | 7/2009 |
| WO | 2009092218 A1 | 7/2009 |
| WO | 2010039680 A1 | 4/2010 |
| WO | 2010139489 A1 | 12/2010 |
| WO | 2011146088 A1 | 11/2011 |
| WO | 2012041978 A2 | 4/2012 |
| WO | 2014193610 A1 | 12/2014 |
| ZA | 200101708 B | 8/2001 |

OTHER PUBLICATIONS

ISR pertaining to International application No. PCT/US2010/047251 dated Aug. 31, 2010.
ISR pertaining to International application No. PCT/US2010/035058 dated May 17, 2010.
ISR and WO pertaining to International application No. PCT/US2009/045004 dated May 22, 2009.
ISR and WO pertaining to International application No. PCT/US2009/037293 dated Mar. 16, 2009.
ISR and WO pertaining to International application No. PCT/US2009/032933 dated Nov. 3, 2009.

(56) References Cited

OTHER PUBLICATIONS

ISR and WO pertaining to International application No. PCT/US2009/031740 dated Jan. 23, 2009.
ISR and WO pertaining to International application No. PCT/US2008/083526 dated Nov. 14, 2008.
ISR and WO pertaining to International application No. PCT/US2008/063193 dated May 9, 2008.
ISR and WO pertaining to International application No. PCT/US2007/078340 dated Sep. 13, 2007.
ISR and WO pertaining to International application No. PCT/US2007/078016 dated Sep. 10, 2007.
ISR and WO pertaining to International application No. PCT/US2007/078001 dated Sep. 10, 2007.
ISR and WO pertaining to International application No. PCT/US2007/076699 dated Aug. 24, 2007.
ISR and WO pertaining to International application No. PCT/US2007/066697 dated Apr. 16, 2007.
ISR and WO pertaining to International application No. PCT/US2007/001428 dated Jan. 18, 2007.
ISR and WO pertaining to International application No. PCT US2006/032893 dated Aug. 24, 2006.
Grabs, Ulrike, "Modifiction of Electronic Interlocking EI S in Service", Signal+Draht, Telzlaff Verlag GmbH, 1995, pp. 254-258, V87(7/08), Darmstadt, DE.
Cheng, J.X. et al. Article 3523-3527.
Chang et al. "Cycle Detection in Repair-Based Railway Scheduling System", Robotics and Automation, 1996 pp. 2517-2522, V3, New York, NY.
Cheng, Yu, "Hybrid Simulation for Resolving Resource conflicts in Train Traffic Rescheduling", Computers in Industry, 1998, pp. 233-246, V35(3), Amsterdam, NL.
Salasoo,Lembit, "Heavy vehicle systems optimization program: FY 2004 Annual Report".
DOE, "21st Century Locomotive Technology-Quarterly Technical Status Report 6".
DOE, "21st Century Locomotive Technology, Quarterly Technical Status Report 11".
King, Robert D., "DOE heavy vehicle systems optimization (peer review): 21st Century Locomotive Technology".
Unofficial English translation of Office Action issued in connection with related CN Application No. 201210161080.X on Apr. 29, 2014.
Non-Final Rejection towards related U.S. Appl. No. 13/171,712 dated May 8, 2014.
Knight, "10-4, Good Computer:Automated System Lets Trucks Convoy as One", MIT Technology Review, May 28, 2014.
Unofficial English translation of Office Action issued in connection with related CN Application No. 201080027403.5 on Jun. 13, 2014.
International Search Report and Written Opinion issued in connection with related PCT Application No. PCT/ dated Jun. 23, 2014. US2013/053128.
Notice of Allowance issued in connection with corresponding U.S. Appl. No. 13/545,271 dated Jun. 26, 2014.
International Search Report and Written Opinion issued in connection with related PCT Application No. PCT/US2013/053124 dated Jul. 4, 2014.
Notice of Allowance issued in connection with corresponding US Appl. No. 13/595,474 dated Aug. 5, 2014.
Notice of Allowance issued in connection with related U.S. Appl. No. 14/016,310 dated Aug. 18, 2014.
Non-Final Rejection towards related U.S. Appl. No. 12/573,141 dated Aug. 29, 2014.
Final Rejection towards related U.S. Appl. No. 13/778,428 dated Sep. 9, 2014.
Non-Final Rejection towards related U.S. Appl. No. 13/618,970 dated Sep. 9, 2014.
Non-Final Rejection towards related U.S. Appl. No. 14/095,373 dated Sep. 16, 2014.
Non-Final Rejection towards related U.S. Appl. No. 13/565,571 dated Oct. 2, 2014.
Unofficial English translation of Notice of allowance issued in connection with related KZ Application No. 2013/1558.1 Nov. 6, 2014.
Notice of Allowance issued in connection with related U.S. Appl. No. 13/618,970 dated Nov. 19, 2014.
Notice of Allowance issued in connection with related AU Application No. 2010292820 dated Nov. 19, 2014.
Maldonado et al., "Autonomous Broken Rail Detection Technology for Use on Revenue Service Trains", U.S. Department Of Transportation, Federal Railroad Administration, pp. 1-4, Dec. 2014.
Non-Final Rejection towards related U.S. Appl. No. 13/591,561 dated Feb. 13, 2015.
Final Rejection towards related U.S. Appl. No. 12/573,141 dated Mar. 10, 2015.
Non-Final Rejection towards related U.S. Appl. No. 13/171,712 dated Mar. 10, 2015.
Non-Final Rejection towards corresponding U.S. Appl. No. 14/489,126 dated Apr. 9, 2015.
Non-Final Rejection towards related U.S. Appl. No. 11/669,364 dated Apr. 23, 2015.
Notice of Allowance issued in connection with related US Appl. No. 13/653,440 dated Apr. 30, 2015.
Ridgetop Group, "Ridgetop Group Announces New Products for Rail Safety Improvements", pp. 1-2, May 18, 2015.
Final Rejection towards related U.S. Appl. No. 13/591,561 dated Jun. 11, 2015.
Office Action issued in connection with related JP Application No. 2012-034736 dated on Jun. 16, 2015.
Non-Final Rejection towards related U.S. Appl. No. 14/491,339 dated Jun. 17, 2015.
Non-Final Rejection towards related U.S. Appl. No. 14/221,624 dated Jun. 19, 2015.
Notice of Allowance issued in connection with corresponding U.S. Appl. No. 14/489,126 dated Jun. 24, 2015.
Notice of Allowance issued in connection with related U.S. Appl. No. 11/669,364 dated Sep. 17, 2015.
Non-Final Rejection towards related U.S. Appl. No. 14/527,246 dated Sep. 22, 2015.
Final Rejection towards related U.S. Appl. No. 14/221,624 dated Oct. 5, 2015.
Non-Final Rejection towards related U.S. Appl. No. 13/939,326 dated Oct. 9, 2015.
Office Action issued in connection with related EP Application No. 11187312.1 on Oct. 15, 2015.
Non-Final Rejection towards related U.S. Appl. No. 14/457,304 dated Oct. 22, 2015.
Sperry, "Sperry B-Scan Single Rail Walking Sticks", Informational pamphlet, Oct. 26, 2015.
Non-Final Rejection towards related U.S. Appl. No. 14/657,233 dated Nov. 18, 2015.
Non-Final Rejection towards related U.S. Appl. No. 14/679,217 dated Dec. 17, 2015.
Non-Final Rejection towards related U.S. Appl. No. 14/696,124 dated Dec. 23, 2015.
Eurasia Search Report and Written Opinion issued in connection with related EA Application No. 201591274 dated Jan. 21, 2016.
Unofficial English translation of Office Action issued in connection with related CN Application No. 201380071077.1 dated Feb. 6, 2016.
Notice of Allowance issued in connection with related U.S. Appl. No. 14/527,246 dated Feb. 23, 2016.
Office Action issued in connection with related AU Application No. 2015200168 dated Mar. 2, 2016.
Notice of Allowance issued in connection with related U.S. Appll. No. 13/591,561 dated Mar. 3, 2016.
Unofficial English translation of Office Action issued in connection with related RU Application No. 2012124894 dated Mar. 9, 2016.
Unofficial English translation of Office Action issued in connection with related CN Application No. 201310220043.6 dated Mar. 14, 2016.
Eurasia Search Report and Written Opinion issued in connection with related EA Application No. 201591504 dated Apr. 6, 2016.

(56) References Cited

OTHER PUBLICATIONS

Final Rejection towards related U.S. Appl. No. 14/679,217 dated Apr. 15, 2016.
Non-Final Rejection towards related U.S. Appl. No. 14/457,304 dated May 5, 2016.
Non-Final Rejection towards related U.S. Appl. No. 14/637,513 dated May 19, 2016.
Office Action issued in connection with related EP Application No. 08832181.5 dated Jun. 14, 2016.
International Search Report and Written Opinion issued in connection with related PCT Application No. PCT/US2016/021925 dated Jun. 23, 2016.
Non-Final Rejection towards related U.S. Appl. No. 14/933,659 dated Jun. 30, 2016.
Office Action issued in connection with related AU Application No. 2013216630 dated Aug. 4, 2016.
Unofficial English translation of Notice of Allowance issued in connection with related RU Application No. 2012124894 dated Aug. 5, 2016.
Office Action issued in connection with related AU Application nNo. 2013299945 dated Aug. 8, 2016.
International Search Report and Written Opinion issued in connection with related PCT Application No. PCT/US2016/031444 dated Aug. 24, 2016.
Non-Final Rejection towards related U.S. Appl. No. 14/657,233 dated Sep. 7, 2016.
Office Action issued in connection with related AU Application No. 2013299501 dated Oct. 7, 2016.
European Search Report and Written Opinion issued in connection with related EP Application No. 16170151.1 dated Oct. 21, 2016.
Notice of Allowance issued in connection with related U.S. Appl. No. 14/679,217 dated Oct. 24, 2016.
Notice of Allowance issued in connection with related U.S. Appl. No. 14/457,304 dated Oct. 28, 2016.
European Search Report and Written Opinion issued in connection with related EP Application No. 13856206.1 dated Nov. 11, 2016.
Unofficial English translation of Office Action issued in connection with corresponding CN Application No. 201210356915.7 dated Dec. 2, 2016.
Krevitt, "Remote Maintenance Techniques Proposed for the 200-BEV Accelerator", IEEE Transactions on Nuclear Science, vol. No. 14, Issue No. 3, pp. 997-1003, Jun. 1967.
Kiersztyn et al., "Evaluation of Locomotive Cable Insulation Life Under Varying Temperature Loading", IEEE Transactions on Industry Applications, vol. No. IA-21, Issue No. 4, pp. 882-888, Jul./Aug. 1985.
Hoyt et al., "Assessing the effects of several variables on freight train fuel consumption and performance using a train performance simulator", Transportation Research, vol. No. 24A, Issue No. 2, pp. 99-112, Jan. 1, 1990.
Hooper, "Reducing Rail Costs through Innovative Methods", Railway Track and Structures, pp. 14-17, Jul. 1993.
Grizzle et al., "Improved Cylinder Air Charge Estimation for Transient Air Fuel Ratio Control", Proceedings of the American Control Conference, Maryland, vol. No. 2, pp. 1568-1573, Jun. 29, 1994.
Bonissone et al., "Genetic algorithms for automated tuning of fuzzy controllers: A transportation application", Proceedings of the Fifth IEEE International Conference on Fuzzy Systems, Schenectady, NY, USA, vol. No. 1, pp. 674-680, 1996.
Ehsani et al., "Application of electrically peaking hybrid (ELPH) propulsion system to a full-size passenger car with simulated design verification", IEEE Transactions on Vehicular Technology, vol. No. 48, Issue No. 6, pp. 1779-1787, Nov. 1999.
He et al., "On-line Parameter Identification for Freight Train Systems", Aug. 29, 2000.
Franke et al., "An algorithm for the optimal control of the driving of trains", Proceedings of the 39th IEEE Conference on Decision and Control, Sydney Australia, pp. 2123-2127, Dec. 2000.

Dick et al., "Predicting the Occurrence of Broken Rails: a Quantitative Approach", In Proceedings of the American railway engineering and maintenance of way association annual conference, TX, USA, 2000.
Rose et al., "Application and potential of guided wave rail inspection", Defect Detection in Rail, Insight, vol. No. 44, Issue No. 6, pp. 353-358, Jun. 2002.
Aharoni et al., "A Novel high-speed rail inspection system", vol. No. 7, Issue No. 10, pp. 1-8, Oct. 2002.
Coleman, "A System for long haul Optimal Driver Advice", Session 5b: Capacity Planning & Train Scheduling, pp. 5.61-5.69, 2003.
Dick et al., "Multivariate statistical Model for Predicting Occurrence and Location of Broken Rails", Transportation Research Record: Journal of the Transportation Research Board, pp. 48-55, 2003.
Bosch, "Technology explained: the Common Rail diesel injection system", May 2004.
Turner, "Feasibility of Locomotive-Mounted Broken Rail Detection", Final Report for High-Speed Rail Idea Project 38 Idea, Transportation Research Board of the National Academies, Jun. 2004.
Hou et al., "A Rail Damage Detection and Measurement System Using Neural Networks", IEEE International conference on Computational Intelligence for Measurement Systems and Applications, CIMSA, Boston, MA, USA, pp. 4-9, Jul. 14-16, 2004.
Chan et al., "Trip Optimizer System Description (Rev. 1.1)", Trip Optimizer for Freight Trains Functional Description, pp. 1-24, Nov. 16, 2005.
Non-Final Rejection towards related U.S. Appl. No. 10/736,089 dated Feb. 13, 2006.
Ditmeyer, "Network Centric Railroading Utilizing Intelligent Railroad Systems", World Bank Transport Forum Rail Transport for Development, pp. 1-21, Mar. 31, 2006.
Brawner et al., "Magnetometer Sensor Feasibility for Railroad and Highway Equipment Detection", Innovations Deserving Exploratory Analysis Programs, HSR IDEA Program Final Report, pp. 1-27, Jun. 24, 2006.
Innotrack, "D4.4.1—Rail Inspection Technologies", Innovative Track Systems, pp. 1-42, Sep. 1, 2006.
International Invitation to Pay Additional Fees issued in connection with related PCT Application No. PCT/US2007/066697 dated Sep. 21, 2007.
Chen et al., "Fault Detection and Diagnosis for Railway Track Circuits Using Neuro-Fuzzy Systems", Control Engineering Practice, vol. No. 16, pp. 585-596, May 2008.
Non-Final Rejection towards related U.S. Appl. No. 11/858,345 dated Jun. 20, 2008.
Ho et al., "Signature Analysis on Wheel-Rail Interaction for Rail Defect Detection", Railway Condition Monitoring, 4th IET International Conference, Hong Kong, pp. 1-6, Jun. 2008.
Non-Final Rejection towards related U.S. Appl. No. 11/858,345 dated Nov. 19, 2008.
Final Rejection towards related U.S. Appl. No. 10/736,089 dated Dec. 12, 2008.
Unofficial English translation of Notice of Allowance issued in connection with related RU Application No. 2006125429 dated Dec. 22, 2008.
International Search Report and Written Opinion issued in connection with related PCT Application No. PCT/US2008/071958 dated Dec. 30, 2008.
Schafer II, "Effect of Train Length on Railroad Accidents and a Quantitative Analysis of Factors Affecting Broken Rails", 2008.
Non-Final Rejection towards related U.S. Appl. No. 11/858,345 dated Mar. 6, 2009.
Ghanbari et al., "Artificial Neural Networks and regression approaches comparison for forecasting Iran's annual electricity load", Power Engineering, Energy and Electrical Drives, Powereng, pp. 675-679, Mar. 18-20, 2009.
Unofficial English translation of Office Action issued in connection with related CN Application No. 200480040639.7 dated Apr. 17, 2009.

(56) References Cited

OTHER PUBLICATIONS

Xin-Yu et al., "The Research on the Mechanism of Limiting Speed Pick-Up and Set-Out Train on Railway Transportation Capacity Loss", Second International Conference on Intelligent Computation Technology and Automation, Changsha, China, vol. No. 3, pp. 830-833, 2009.
Patra et al., "Availability Analysis of Railway Track Circuits", Proceedings of the Institution of Mechanical Engineers, Part F: Journal of Rail and Rapid Transit, vol. No. 224, Issue No. 3, pp. 169-177, May 1, 2010.
Office Action issued in connection with related AU Application No. 2007333518 dated Aug. 9, 2010.
International Search Report and Written Opinion issued in connection with related PCT Application No. PCT/US2010/035058 dated Aug. 20, 2010.
Non-Final Rejection towards related U. S. Appl. No. 10/736,089 dated Sep. 2, 2010.
Office Action issued in connection with related CN Application No. 200780001185.6 dated Oct. 27, 2010.
Xiaogang et al., "The Research and Application of 1089 t/h Circulating Fluidized Bed Unit Coordinate Control System", International Conference on E-Product E-Service and E-Entertainment (ICEEE), China, 2010.
Xun et al., "The analysis of GSM-R redundant network and reliability models on high-speed railway", International Conference on Electronics and Information Engineering (ICEIE), Beijing, China, vol. No. 2, pp. V2-154-V2-158, 2010.
International Search Report and Written Opinion issued in connection with related PCT Application No. PCT/US2010/048856 dated Feb. 8, 2011.
International Invitation to Pay Additional Fees issued in connection with related PCT Application No. PCT/US10/47251 dated Mar. 4, 2011.
Unofficial English translation of Office Action issued in connection with related RU Application No. 2008110502 dated Mar. 10, 2011.
Non-Final Rejection towards related U.S. Appl. No. 11/765,443 dated Mar. 16, 2011.
Non-Final Rejection towards related U.S. Appl. No. 12/061,486 dated Apr. 1, 2011.
Unofficial English translation of Office Action issued in connection with corresponding RU Application No. 2007126476 dated Apr. 11, 2011.
International Search Report and Written Opinion issued in connection with related PCT Application No. PCT/US2010/047251 dated Apr. 26, 2011.
Unofficial English translation of Office Action issued in connection with related RU Application No. 2010115501 dated May 26, 2011.
Office Action issued in connection with related AU Application No. 2007253963 dated on Jun. 29, 2011.
Unofficial English translation of Office Action issued in connection with corresponding RU Application No. 2008109009 dated Aug. 23, 2011.
Non-Final Rejection towards related U.S. Appl. No. 12/027,408 dated Sep. 13, 2011.
International Search Report and Written Opinion issued in connection with related PCT Application No. PCT/US2010/045402 dated Sep. 26, 2011.
Office Action issued in connection with related AU Application No. 2008302642 dated Sep. 29, 2011.
Unofficial English translation of Office Action issued in connection with related RU Application No. 2008125850 on Sep. 29, 2011.
Non-Final Rejection towards related U.S. Appl No. 12/365,359 dated Oct. 6, 2011.
Unofficial English translation of Office Action issued in connection with related JP Application No. 2009-511134 dated Oct. 25, 2011.
Unofficial English translation of Office Action issued in connection with corresponding RU Application No. 2008108985 dated Oct. 26, 2011.
Unofficial English translation of Office Action issued in connection with related RU Application No. 2008108972 dated Oct. 28, 2011.
Notice of Allowance issued in connection with related AU Application No. 2007333518 dated Nov. 14, 2011.
Final Rejection towards related U.S. Appl. No. 12/061,486 dated Nov. 16, 2011.
Notice of Allowance issued in connection with corresponding U.S. Appl. No. 12/047,427 dated Dec. 30, 2011.
Weart, "Maintenance of Way: Track inspection technology", pp. 1-7, Dec. 2011.
Pan et al., "Full process control strategy of fuel based on water-coal ratio of ultra supercritical units", Electronics, Communications and Control (ICECC), IEEE International Conference, Guangzhou, China, pp. 3750-3753, 2011.
Non-Final Rejection towards related U.S. Appl. No. 12/126,858 dated Jan. 18, 2012.
Non-Final Rejection towards related U.S. Appl. No. 12/061,444 dated Jan. 31, 2012.
Non-Final Rejection towards related U.S. Appl. No. 11/622,136 dated Feb. 27, 2012.
Shantihini et al., "Electromagnetic System for Railroad Track Crack Detection", British Journal of Science, vol. No. 4, Issue No. 1, pp. 49-56, Feb. 2012.
Unofficial English translation of Office Action issued in connection with related JP Application No. 2009-530500 dated Apr. 3, 2012.
Non-Final Rejection towards related U.S. Appl. No. 12/061,486 dated Apr. 4, 2012.
Non-Final Rejection towards related U.S. Appl. No. 12/484,278 dated Apr. 5, 2012.
Notice of Allowance issued in connection with related AU Application No. 2008302642 dated May 10, 2012.
Final Rejection towards related U.S. Appl. No. 12/128,249 dated May 15, 2012.
Notice of Allowance issued in connection with related U.S. Appl. No. 12/126,858 dated Jun. 18, 2012.
Unofficial English translation of Notice of Allowance issued in connection with related RU Application No. 2008124977 dated Jun. 22, 2012.
Unofficial English translation of Notice of Allowance issued in connection with related RU Application No. 2008110502 dated Jul. 3, 2012.
Unofficial English translation of Office Action issued in connection with related CN Application No. 200980112545.9 dated Sep. 11, 2012.
Non-Final Rejection towards corresponding U.S. Appl. No. 12/052,816 dated Sep. 12, 2012.
Final Rejection towards related U.S. Appl. No. 12/484,278 dated Sep. 20, 2012.
Non-Final Rejection towards related U.S. Appl. No. 12/556,334 dated Sep. 27, 2012.
Unofficial English translation of Office Action issued in connection with corresponding JP Application No. 2009-540342 dated Oct. 2, 2012.
Non-Final Rejection towards related U.S. Appl. No. 11/669,364 dated Oct. 17, 2012.
Final Rejection towards related U.S. Appl. No. 12/052,000 dated Oct. 24, 2012.
Unofficial English translation of Office Action issued in connection with related CN Application No. 200780001185.6 dated Oct. 29, 2012.
Unofficial English translation of Office Action issued in connection with related CN Application No. 201010584148.6 dated Oct. 30, 2012.
Final Rejection towards related U.S. Appl. No. 12/027,408 dated Oct. 31, 2012.
Unofficial English translation of Notice of Allowance issued in connection with related RU Application No. 2008125850 dated Oct. 31, 2012.
Non-Final Rejection towards related U.S. Appl. No. 12/061,486 dated Nov. 2, 2012.
Unofficial English translation of Office Action issued in connection with related CN Application No. 201010584140.X dated Nov. 21, 2012.
Notice of Allowance issued in connection with related U.S. Appl. No. 12/484,278 dated Nov. 27, 2012.

(56) References Cited

OTHER PUBLICATIONS

Unofficial English translation of Notice of Allowance issued in connection with corresponding RU Application No. 2008108985 dated Dec. 4, 2012.
Office Action issued in connection with related AU Application No. 2010260419 dated Dec. 6, 2012.
Non-Final Rejection towards corresponding U.S. Appl. No. 13/595,474 dated Dec. 11, 2012.
Non-Final Rejection towards related U.S. Appl. No. 12/573,141 dated Dec. 19, 2012.
Unofficial English translation of Notice of Allowance issued in connection with corresponding RU Application No. 2007126476 dated Dec. 21, 2012.
Unofficial English translation of Office Action issued in connection with related CN Application No. 200880108755.6 dated Dec. 26, 2012.
Non-Final Rejection towards related U.S. Appl. No. 12/270,160 dated Dec. 31, 2012.
Unofficial English translation of Office Action issued in connection with related JP Application No. 2009-530500 dated Jan. 8, 2013.
Unofficial English translation of Office Action issued in connection with related JP Application No. 2009-540344 dated Jan. 22, 2013.
Final Rejection towards related U.S. Appl. No. 12/061,444 dated Jan. 31, 2013.
International Invitation to Pay Additional Fees issued in connection with related PCT Application No. PCT/US2012/044367 dated Feb. 1, 2013.
Kun-Peng et al., "Design of transmission system of real-time broken rail detection", Journal of Railway Science and Engineering, vol. No. 10, Issue No. 1, Feb. 2013.
Office Action issued in connection with related AU Application No. 2007253963 on Mar. 12, 2013.
Final Rejection towards related U.S. Appl. No. 11/622,136 dated Mar. 13, 2013.
Non-Final Rejection towards related U.S. Appl. No. 13/175,284 dated Mar. 18, 2013.
Unofficial English translation of Office Action issued in connection with related MX Application No. MX/a/2012/007335 dated Mar. 21, 2013.
Office Action issued in connection with related AU Application No. 2010292820 dated Mar. 26, 2013.
Notice of Allowance issued in connection with related U.S. Appl. No. 13/529,783 dated Mar. 29, 2013.
Notice of Allowance issued in connection with related U.S. Appl. No. 12/556,334 dated Apr. 3, 2013.
Non-Final Rejection towards related U.S. Appl. No. 13/587,966 dated Apr. 5, 2013.
International Search Report and Written Opinion issued in connection with related PCT Application No. PCT/US2012/044367 dated Apr. 9, 2013.
Final Rejection towards related U.S. Appl. No. 11/831,492 dated Apr. 9, 2013.
Non-Final Rejection towards related U.S. Appl. No.12/365,359 dated Apr. 11, 2013.
Office Action issued in connection with related AU Application No. 2013202194 dated Apr. 17, 2013.
Non-Final Rejection towards related U.S. Appl. No. 12/027,408 dated Apr. 23, 2013.
Unofficial English translation of Office Action issued in connection with related JpP Application No. 2012-034736 dated May 14, 2013.
Notice of Allowance issued in connection with related U.S. Appl. No. 121605,498 dated May 21, 2013.
Non-Final Rejection towards related U.S. Appl. No. 13/171,712 dated May 22, 2013.
Unofficial English translation of Notice of Allowance issued in connection with corresponding RU Application No. 2008109249 dated May 29, 2013.
Notice of Allowance issued in connection with related U.S. Appl. No. 13/175,284 dated Jul. 8, 2013.
Hocking, "Rail Inspection", The Eddy Current Solution, pp. 1-17, Jul. 10, 2013.
Popov, "Automated Ultrasonic Inspection of Rails", pp. 1-5, Jul. 10, 2013.
Sperry, "Sperry B-Scan Dual Rail Inspection System", Sperry Rail Service, for superior technology, training, and reporting, the solution is Sperry, Jul. 10, 2013.
Non-Final Rejection towards related U.S. Appl. No. 12/061,444 dated Aug. 1, 2013.
Non-Final Rejection towards related U.S. Appl. No. 11/831,492 dated Aug. 6, 2013.
Non-Final Rejection towards corresponding U.S. Appl. No. 13/739,133 dated Aug. 28, 2013.
Non-Final Rejection towards related U.S. Appl. No. 13/488,652 dated Sep. 9, 2013.
Non-Final Rejection towards corresponding U.S. Appl. No. 13/344,331 dated Sep. 11, 2013.
Non-Final Rejection towards related U.S. Appl. No. 11/622,136 dated Sep. 12, 2013.
European Search Report and Written Opinion issued in connection with related EP Application No. 11187312.1 dated Oct. 23, 2013.
Notice of Allowance issued in connection with related U.S. Appl. No. 11/831,492 dated Oct. 31, 2013.
Final Rejection towards related U.S. Appl. No. 12/270,160 dated Oct. 31, 2013.
Notice of Allowance issued in connection with related AU Application No. 2010260419 dated Nov. 25, 2013.
Notice of Allowance issued in connection with corresponding U.S. Appl. No. 13/739,133 dated Dec. 11, 2013.
Non-Final Rejection towards related U.S. Appl. No. 13/954,096 dated Dec. 24, 2013.
Zhang et al., "Train Detection by Magnetic Field Sensing", Sensors and Materials, vol. No. 25, Issue No. 6, pp. 423-436, 2013.
International Invitation to Pay Additional Fees issued in connection with related PCT Application No. PCT/US2013/054284 dated Jan. 20, 2014.
Office Action issued in connection with corresponding EP Application No. 07716804.5 dated Jan. 21, 2014.
Copy of Notice of Allowance issued in connection with corresponding US Application no. 13/344,331 dated Jan. 23, 2014.
Copy of Notice of Allowance issued in connection with related US Application no. 12/365,359 dated Jan. 28, 2014.
Copy of International Search Report and Written Opinion issued in connection with related PCT Application No. PCT! dated Feb. 10, 2014. US2013/054300.
Non-Final Rejection towards related application 13/778,428 dated Feb. 25, 2014.
Copy of International Search Report and Written Opinion issued in connection with related PCT Application No. PCT/ dated Feb. 27, 2014. US2013/071237.
Non-Final Rejection towards related application 13/653,440 dated Mar. 19, 2014.
Copy of Notice of Allowance issued in connection with related US Application no. 11/622,136 dated Mar. 27, 2014.
Copy of International Search Report and Written Opinion issued in connection with related PCT Application No. PCT/ dated Apr. 01, 2014. U52013/054284.
Copy of International Invitation to Pay Additional Fees issued in connection with related PCT Application No. PCT/ dated Apr. 02, 2014. US2013/053124.
Non-Final Rejection towards related application 13/840,656 dated Apr. 16, 2014.
Non-Final Rejection towards related application 14/016,310 dated Apr. 22, 2014.

\* cited by examiner

TRIP OPTIMIZATION SYSTEM AND METHOD FOR A TRAIN

STATEMENT REGARDING FEDERALLY SPONSORED RESEARCH OR DEVELOPMENT

This invention was made with government support under contract DE-FC04-2002AL68284 awarded by the U.S. Department of Energy. The government has certain rights in the invention.

FIELD OF THE INVENTION

The field of invention relates to optimizing train operations, and more particularly to monitoring and controlling a train's operations to improve efficiency while satisfying schedule constraints.

BACKGROUND OF THE INVENTION

Locomotives are complex systems with numerous subsystems, with each subsystem being interdependent on other subsystems. An operator is aboard a locomotive to insure the proper operation of the locomotive and its associated load of freight cars. In addition to insuring proper operations of the locomotive the operator also is responsible for determining operating speeds of the train and forces within the train that the locomotives are part of. To perform this function, the operator generally must have extensive experience with operating the locomotive and various trains over the specified terrain. This knowledge is needed to comply with perscribeable operating speeds that may vary with the train location along the track. Moreover, the operator is also responsible for assuring in-train forces remain within acceptable limits.

However, even with knowledge to assure safe operation, the operator cannot usually operate the locomotive so that the fuel consumption is minimized for each trip. For example, other factors that must be considered may include emission output, operator's environmental conditions like noise/vibration, a weighted combination of fuel consumption and emissions output, etc. This is difficult to do since, as an example, the size and loading of trains vary, locomotives and their fuel/emissions characteristics are different, and weather and traffic conditions vary. Operators could more effectively operate a train if they were provided with a means to determine the best way to drive the train on a given day to meet a required schedule (arrival time) while using the least fuel possible, despite sources of variability.

BRIEF DESCRIPTION OF THE INVENTION

Embodiments of the invention disclose a system for operating a train having one or more locomotive consists with each locomotive consist comprising one or more locomotives. In an exemplary embodiment, the system comprises a locator element to determine a location of the train. A track characterization element to provide information about a track is also provided. The system also has a processor operable to receive information from the locator element, and the track characterizing element. An algorithm is also provided which is embodied within the processor having access to the information to create a trip plan that optimizes performance of the locomotive consist in accordance with one or more operational criteria for the train.

An exemplary embodiment of the present invention also discloses a method for operating a train having one or more locomotive consists with each locomotive consist comprising one or more locomotives. The method comprises determining a location of the train on a track. The method also determines a characteristic of the track. The method further creates a trip plan based on the location of the train, the characteristic of the track, and the operating condition of the locomotive consist in accordance with at least one operational criteria for the train.

An exemplary embodiment of the present invention also discloses a computer software code for operating a train having a computer processor and one or more locomotive consists with each locomotive consist comprising one or more locomotives. The computer software code comprises a software module for creating a trip plan based on the location of the train, the characteristic of the track, and the operating condition of the locomotive consist in accordance with at least one operational criteria for the train.

An exemplary embodiment of the present invention further discloses a method for operating a train having one or more locomotive consists with each locomotive consist comprising one or more locomotives where a trip plan has been devised for the train. The method comprises determining a power setting for the locomotive consist based on the trip plan. The method also operates the locomotive consist at the power setting. Actual speed of the train, actual power setting of the locomotive consist, and/or a location of the train is collected. Actual speed of the train, actual power setting of the locomotive consist, and/or a location of the train is compared to the power setting.

Another exemplary embodiment of the present invention further discloses a method for operating a train having one or more locomotive consists with each locomotive consist comprising one or more locomotives where a trip plan has been devised for the train based on assumed operating parameters for the train and/or the locomotive consist. The method comprises estimating train operating parameters and/or locomotive operating parameters. The method further comprises comparing the estimated train operating parameters and/or the locomotive consist operating parameters to the assumed train operating parameters and/or the locomotive consist operating parameters.

Another exemplary embodiment of the present invention further discloses a method for operating a train having one or more locomotive consists with each locomotive consist comprising one or more locomotives where a trip plan has been devised for the train based on a desired parameter. The method comprises determining operational parameters of the train and/or the locomotive consist, determining a desired parameter based on determined operational parameters, and comparing the determined parameter to the operational parameters. If a difference exists from comparing the determined parameter to the operational parameters, the method further comprises adjusting the trip plan.

An exemplary embodiment of the present invention further discloses a method for operating a rail system having one or more locomotive consists with each locomotive consist comprising one or more locomotives. The method comprises determining a location of the train on a track and determining a characteristic of the track. The method further comprises generating a driving plan for at least one of the locomotives based on the locations of the rail system, the characteristic of the track, and/or the operating condition of the locomotive consist, in order to minimize fuel consumption by the rail system.

Another exemplary embodiment of the present invention further discloses a method for operating a rail system having one or more locomotive consists with each locomotive consist comprising one or more locomotives. Towards this end the method comprises determining a location of the train on a track, and determining a characteristic of the track. The method further comprises providing propulsion control for the locomotive consist in order to minimize fuel consumption by the rail system.

BRIEF DESCRIPTION OF THE DRAWINGS

A more particular description of examples of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
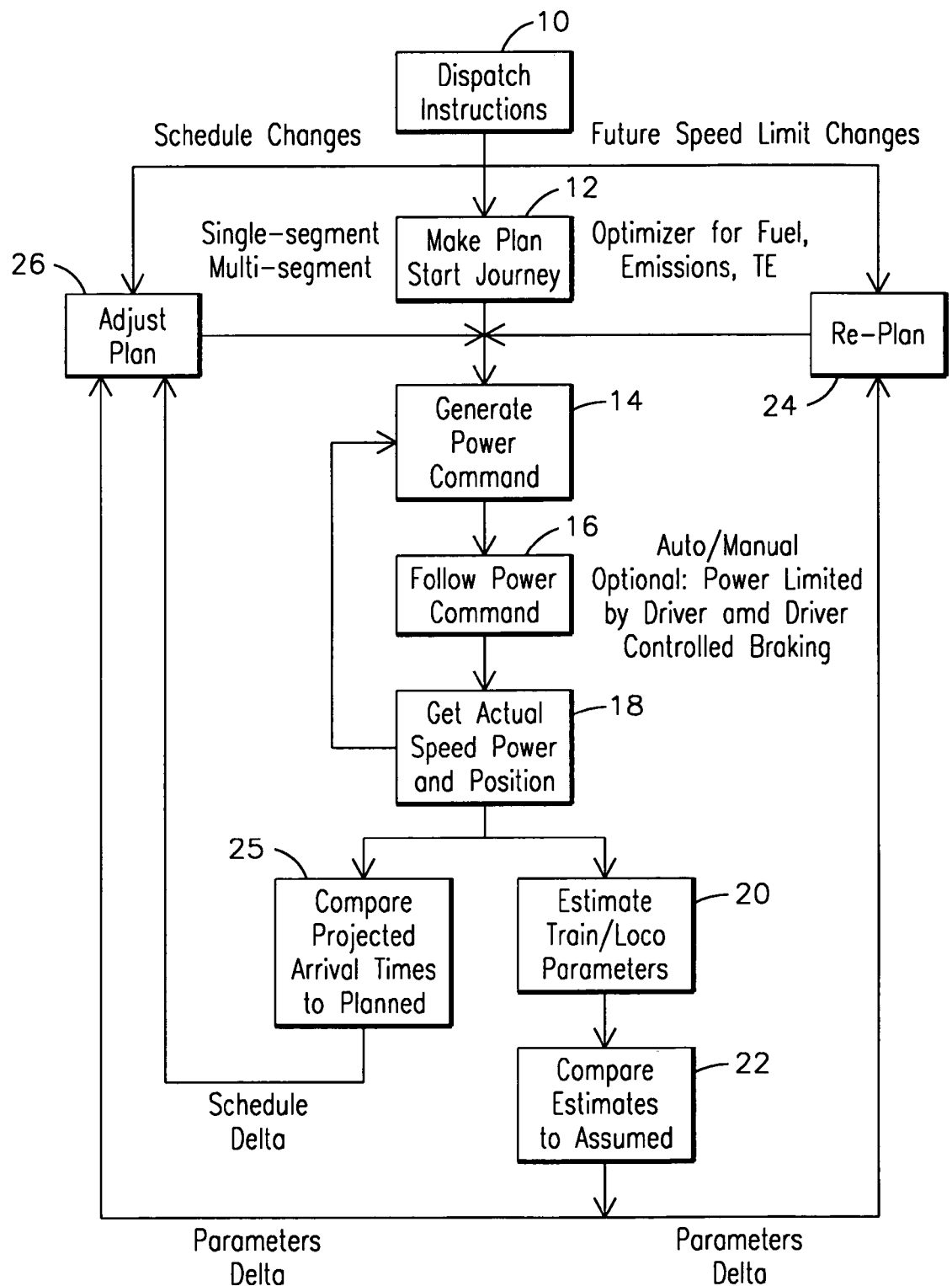
FIG. 1 depicts an exemplary illustration of a flow chart of an exemplary embodiment of the present invention.

Reference will now be made in detail to the embodiments consistent with the invention, examples of which are illustrated in the accompanying drawings. Wherever possible, the same reference numerals used throughout the drawings refer to the same or like parts.

Exemplary embodiments of the present invention solve the problems in the art by providing a system, method, and computer implemented method for determining and implementing a driving strategy of a train having a locomotive consist determining an approach to monitor and control a train's operations to improve certain objective operating criteria parameter requirements while satisfying schedule and speed constraints. Throughout this disclose the term "present invention" or "invention" is used. Even through the term "exemplary embodiment(s)" does not immediately proceed the above cited term, the intent of "present invention" or "invention" is read to mean "exemplary embodiment(s) of the present invention." The present invention is also operable when the locomotive consist is in distributed power operations. Persons skilled in the art will recognize that an apparatus, such as a data processing system, including a CPU, memory, I/O, program storage, a connecting bus, and other appropriate components, could be programmed or otherwise designed to facilitate the practice of the method of the invention. Such a system would include appropriate program means for executing the method of the invention.

Also, an article of manufacture, such as a pre-recorded disk or other similar computer program product, for use with a data processing system, could include a storage medium and program means recorded thereon for directing the data processing system to facilitate the practice of the method of the invention. Such apparatus and articles of manufacture also fall within the spirit and scope of the invention.

Broadly speaking, the technical effect is determining and implementing a driving strategy of a train having a locomotive consist determining an approach to monitor and control a train's operations to improve certain objective operating criteria parameter requirements while satisfying schedule and speed constraints. To facilitate an understanding of the present invention, it is described hereinafter with reference to specific implementations thereof. The invention is described in the general context of computer-executable instructions, such as program modules, being executed by a computer. Generally, program modules include routines, programs, objects, components, data structures, etc. that perform particular tasks or implement particular abstract data types. For example, the software programs that underlie the invention can be coded in different languages, for use with different platforms. In the description that follows, examples of the invention are described in the context of a web portal that employs a web browser. It will be appreciated, however, that the principles that underlie the invention can be implemented with other types of computer software technologies as well.

Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices. These local and remote computing environments may be contained entirely within the locomotive, or adjacent locomotives in consist, or off-board in wayside or central offices where wireless communication is used.

Throughout this document the term locomotive consist is used. As used herein, a locomotive consist may be described as having one or more locomotives in succession, connected together so as to provide motoring and/or braking capability. The locomotives are connected together where no train cars are in between the locomotives. The train can have more than one consist in its composition. Specifically, there can be a lead consist, and more than one remote consists, such as midway in the line of cars and another remote consist at the end of the train. Each locomotive consist may have a first locomotive and trail locomotive(s). Though a consist is usually viewed as successive locomotives, those skilled in the art will readily recognize that a consist group of locomotives may also be recognized as a consist even when at least a car separates the locomotives, such as when the consist is configured for distributed power operation, wherein throttle and braking commands are relayed from the lead locomotive to the remote trails by a radio link or physical cable. Towards this end, the term locomotive consist should be not be considered a limiting factor when discussing multiple locomotives within the same train.

Referring now to the drawings, embodiments of the present invention will be described. The invention can be implemented in numerous ways, including as a system (including a computer processing system), a method (including a computerized method), an apparatus, a computer readable medium, a computer program product, a graphical user interface, including a web portal, or a data structure tangibly fixed in a computer readable memory. Several embodiments of the invention are discussed below.

FIG. 1 depicts an exemplary illustration of a flow chart of the present invention. As illustrated, instructions are input specific to planning a trip either on board or from a remote location, such as a dispatch center 10. Such input information includes, but is not limited to, train position, consist description (such as locomotive models), locomotive power description, performance of locomotive traction transmission, consumption of engine fuel as a function of output power, cooling characteristics, the intended trip route (effective track grade and curvature as function of milepost or an "effective grade" component to reflect curvature following standard railroad practices), the train represented by car makeup and loading together with effective drag coefficients, trip desired parameters including, but not limited to, start time and location, end location, desired travel time, crew (user and/or operator) identification, crew shift expiration time, and route.

This data may be provided to the locomotive 42 in a number of ways, such as, but not limited to, an operator manually entering this data into the locomotive 42 via an onboard display, inserting a memory device such as a hard card and/or USB drive containing the data into a receptacle aboard the locomotive, and transmitting the information via wireless communication from a central or wayside location 41, such as a track signaling device and/or a wayside device, to the locomotive 42. Locomotive 42 and train 31 load characteristics (e.g., drag) may also change over the route (e.g., with altitude, ambient temperature and condition of the rails and rail-cars), and the plan may be updated to reflect such changes as needed by any of the methods discussed above and/or by real-time autonomous collection of locomotive/train conditions. This includes for example, changes in locomotive or train characteristics detected by monitoring equipment on or off board the locomotive(s) 42.

The track signal system determines the allowable speed of the train. There are many types of track signal systems and the operating rules associated with each of the signals. For example, some signals have a single light (on/off), some signals have a single lens with multiple colors, and some signals have multiple lights and colors. These signals can indicate the track is clear and the train may proceed at max allowable speed. They can also indicate a reduced speed or stop is required. This reduced speed may need to be achieved immediately, or at a certain location (e.g. prior to the next signal or crossing).

The signal status is communicated to the train and/or operator through various means. Some systems have circuits in the track and inductive pick-up coils on the locomotives. Other systems have wireless communications systems. Signal systems can also require the operator to visually inspect the signal and take the appropriate actions.

The signaling system may interface with the on-board signal system and adjust the locomotive speed according to the inputs and the appropriate operating rules. For signal systems that require the operator to visually inspect the signal status, the operator screen will present the appropriate signal options for the operator to enter based on the train's location. The type of signal systems and operating rules, as a function of location, may be stored in an onboard database 63.

Based on the specification data input into the present invention, an optimal plan which minimizes fuel use and/or emissions produced subject to speed limit constraints along the route with desired start and end times is computed to produce a trip profile 12. The profile contains the optimal speed and power (notch) settings the train is to follow, expressed as a function of distance and/or time, and such train operating limits, including but not limited to, the maximum notch power and brake settings, and speed limits as a function of location, and the expected fuel used and emissions generated. In an exemplary embodiment, the value for the notch setting is selected to obtain throttle change decisions about once every 10 to 30 seconds. Those skilled in the art will readily recognize that the throttle change decisions may occur at a longer or shorter duration, if needed and/or desired to follow an optimal speed profile. In a broader sense, it should be evident to ones skilled in the art the profiles provides power settings for the train, either at the train level, consist level and/or individual train level. Power comprises braking power, motoring power, and air-brake power. In another preferred embodiment, instead of operating at the traditional discrete notch power settings, the present invention is able to select a continuous power setting determined as optimal for the profile selected. Thus, for example, if an optimal profile specifies a notch setting of 6.8, instead of operating at notch setting 7, the locomotive 42 can operate at 6.8. Allowing such intermediate power settings may bring additional efficiency benefits as described below.

The procedure used to compute the optimal profile can be any number of methods for computing a power sequence that drives the train 31 to minimize fuel and/or emissions subject to locomotive operating and schedule constraints, as summarized below. In some cases the required optimal profile may be close enough to one previously determined, owing to the similarity of the train configuration, route and environmental conditions. In these cases it may be sufficient to look up the driving trajectory within a database 63 and attempt to follow it. When no previously computed plan is suitable, methods to compute a new one include, but are not limited to, direct calculation of the optimal profile using differential equation models which approximate the train physics of motion. The setup involves selection of a quantitative objective function, commonly a weighted sum (integral) of model variables that correspond to rate of fuel consumption and emissions generation plus a term to penalize excessive throttle variation.

An optimal control formulation is set up to minimize the quantitative objective function subject to constraints including but not limited to, speed limits and minimum and maximum power (throttle) settings. Depending on planning objectives at any time, the problem may be setup flexibly to minimize fuel subject to constraints on emissions and speed limits, or to minimize emissions, subject to constraints on fuel use and arrival time. It is also possible to setup, for example, a goal to minimize the total travel time without constraints on total emissions or fuel use where such relaxation of constraints would be permitted or required for the mission.

Mathematically, the problem to be solved may be stated more precisely. The basic physics are expressed by:

$$\frac{dx}{dt} = v; x(0) = 0.0; x(T_f) = D$$

-continued $$\frac{dv}{dt} = T_e(u, v) - G_a(x) - R(v); v(0) = 0.0; v(T_f) = 0.0$$

Where x is the position of the train, v its velocity and t is time (in miles, miles per hour and minutes or hours as appropriate) and u is the notch (throttle) command input. Further, D denotes the distance to be traveled, $T_f$ the desired arrival time at distance D along the track, $T_e$ is the tractive effort produced by the locomotive consist, $G_a$ is the gravitational drag which depends on the train length, train makeup and terrain on which the train is located, R is the net speed dependent drag of the locomotive consist and train combination. The initial and final speeds can also be specified, but without loss of generality are taken to be zero here (train stopped at beginning and end). Finally, the model is readily modified to include other important dynamics such the lag between a change in throttle, u, and the resulting tractive effort or braking. Using this model, an optimal control formulation is set up to minimize the quantitative objective function subject to constraints including but not limited to, speed limits and minimum and maximum power (throttle) settings. Depending on planning objectives at any time, the problem may be setup flexibly to minimize fuel subject to constraints on emissions and speed limits, or to minimize emissions, subject to constraints on fuel use and arrival time.

It is also possible to setup, for example, a goal to minimize the total travel time without constraints on total emissions or fuel use where such relaxation of constraints would be permitted or required for the mission. All these performance measures can be expressed as a linear combination of any of the following:

1. $\min_{u(t)} \int_0^{T_f} F(u(t)) dt$ -Minimize total fuel consumption

2. $\min_{u(t)} T_f$ -Minimize Travel Time

3. $\min_{u_i} \sum_{i=2}^{n_d} (u_i - u_{i-1})^2$ - Minimize notch jokeying (piecewise constant input)

$\min_{u(t)} \int_0^{T_f} (du/dt)^2 dt$ - Minimize notch jockeying (continuous input)

4. Replace the fuel term F in (1) with a term corresponding to emissions production.

A commonly used and representative objective function is thus $$\min_{u(t)} \alpha_1 \int_0^{T_f} F(u(t)) dt + \alpha_3 T_f + \alpha_2 \int_0^{T_f} (du/dt)^2 dt \quad \text{(OP)}$$

The coefficients of the linear combination will depend on the importance (weight) given for each of the terms. Note that in equation (OP), u(t) is the optimizing variable which is the continuous notch position. If discrete notch is required, e.g. for older locomotives, the solution to equation (OP) would be discretized, which may result in less fuel saving. Finding a minimum time solution ($\alpha_1$ and $\alpha_2$ set to zero) is used to find a lower bound on, the preferred embodiment is to solve the equation (OP) for various values of $T_f$ with $\alpha_3$ set to zero.

For those familiar with solutions to such optimal problems, it may be necessary to adjoin constraints, e.g. the speed limits along the path $$0 \le v \le SL(x)$$

Or when using minimum time as the objective, that an end point constraint must hold, e.g. total fuel consumed must be less than what is in the tank, e.g. via:

$$0 < \int_0^{T_f} F(u(t)) dt \le W_F$$

Where $W_F$ is the fuel remaining in the tank at $T_f$. Those skilled in the art will readily recognize that equation (OP) can be in other forms as well and that what is presented above is an exemplary equation for use in the present invention.

Reference to emissions in the context of the present invention is actually directed towards cumulative emissions produced in the form of oxides of nitrogen (NOx), unburned hydrocarbons, and particulates. By design, every locomotive must be compliant to EPA standards for brake-specific emissions, and thus when emissions are optimized in the present invention this would be mission total emissions on which there is no specification today. At all times, operations would be compliant with federal EPA mandates. If a key objective during a trip mission is to reduce emissions, the optimal control formulation, equation (OP), would be amended to consider this trip objective. A key flexibility in the optimization setup is that any or all of the trip objectives can vary by geographic region or mission. For example, for a high priority train, minimum time may be the only objective on one route because it is high priority traffic. In another example emission output could vary from state to state along the planned train route.

To solve the resulting optimization problem, in an exemplary embodiment the present invention transcribes a dynamic optimal control problem in the time domain to an equivalent static mathematical programming problem with N decision variables, where the number 'N' depends on the frequency at which throttle and braking adjustments are made and the duration of the trip. For typical problems, this N can be in the thousands. For example in an exemplary embodiment, suppose a train is traveling a 172-mile stretch of track in the southwest United States. Utilizing the present invention, an exemplary 7.6% saving in fuel used may be realized when comparing a trip determined and followed using the present invention versus an actual driver throttle/speed history where the trip was determined by an operator. The improved savings is realized because the optimization realized by using the present invention produces a driving strategy with both less drag loss and little or no braking loss compared to the trip plan of the operator.

Figure 2:
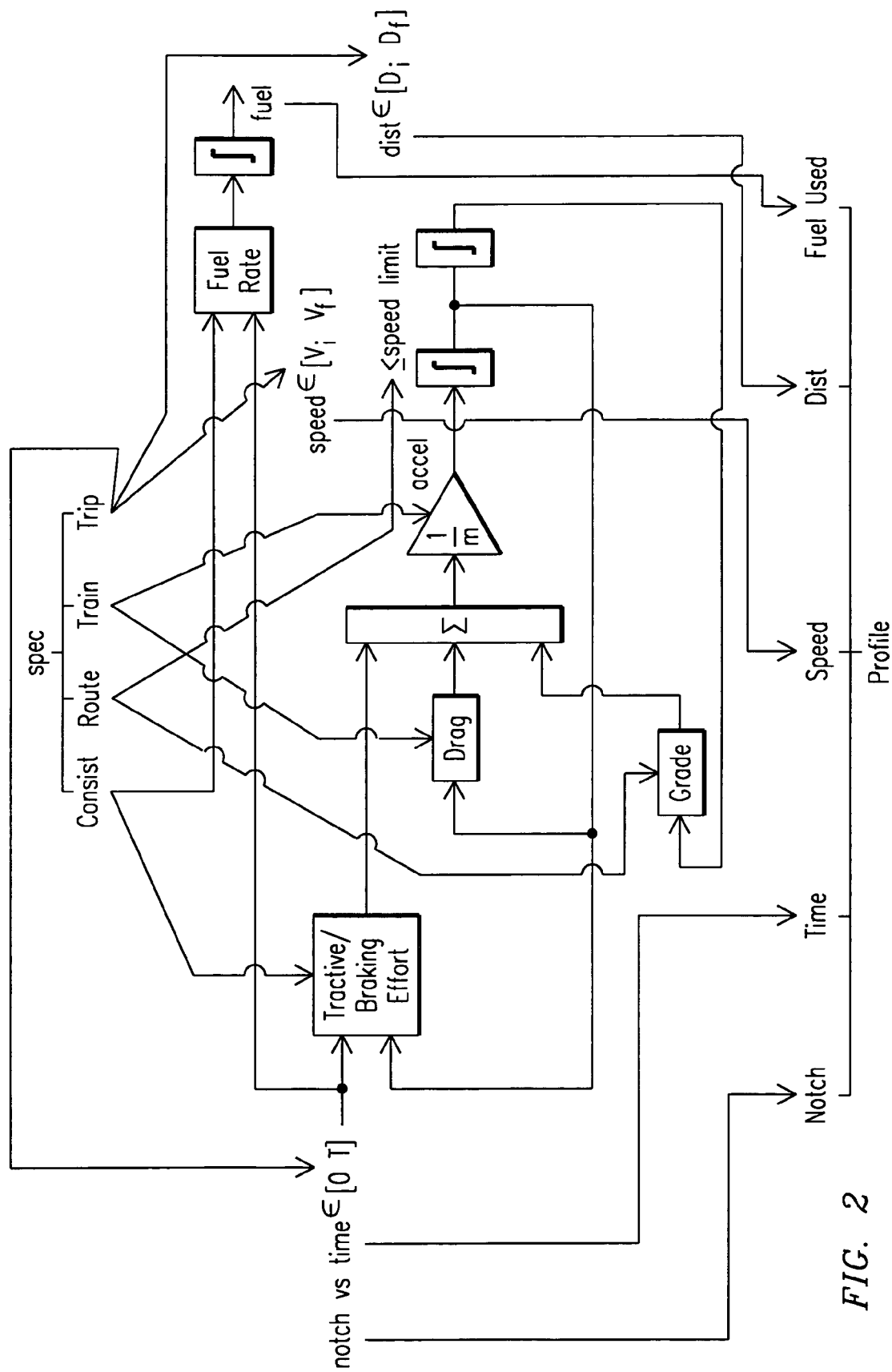
FIG. 2 depicts a simplified model of the train that may be employed.

To make the optimization described above computationally tractable, a simplified model of the train may be employed, such as illustrated in FIG. 2 and the equations discussed above. A key refinement to the optimal profile is produced by driving a more detailed model with the optimal power sequence generated, to test if other thermal, electrical and mechanical constraints are violated, leading to a modified profile with speed versus distance that is closest to a run that can be achieved without harming locomotive or train equipment, i.e. satisfying additional implied constraints such thermal and electrical limits on the locomotive and inter-car forces in the train.

Referring back to FIG. 1, once the trip is started 12, power commands are generated 14 to put the plan in motion. Depending on the operational set-up of the present invention, one command is for the locomotive to follow the optimized power command 16 so as to achieve the optimal speed. The present invention obtains actual speed and power information from the locomotive consist of the train 18. Owing to the inevitable approximations in the models used for the optimization, a closed-loop calculation of corrections to optimized power is obtained to track the desired optimal speed. Such corrections of train operating limits can be made automatically or by the operator, who always has ultimate control of the train.

In some cases, the model used in the optimization may differ significantly from the actual train. This can occur for many reasons, including but not limited to, extra cargo pickups or setouts, locomotives that fail in route, and errors in the initial database 63 or data entry by the operator. For these reasons a monitoring system is in place that uses real-time train data to estimate locomotive and/or train parameters in real time 20. The estimated parameters are then compared to the assumed parameters used when the trip was initially created 22. Based on any differences in the assumed and estimated values, the trip may be re-planned 24, should large enough savings accrue from a new plan.

Other reasons a trip may be re-planned include directives from a remote location, such as dispatch and/or the operator requesting a change in objectives to be consistent with more global movement planning objectives. More global movement planning objectives may include, but are not limited to, other train schedules, allowing exhaust to dissipate from a tunnel, maintenance operations, etc. Another reason may be due to an onboard failure of a component. Strategies for re-planning may be grouped into incremental and major adjustments depending on the severity of the disruption, as discussed in more detail below. In general, a "new" plan must be derived from a solution to the optimization problem equation (OP) described above, but frequently faster approximate solutions can be found, as described herein.

Figure 4:
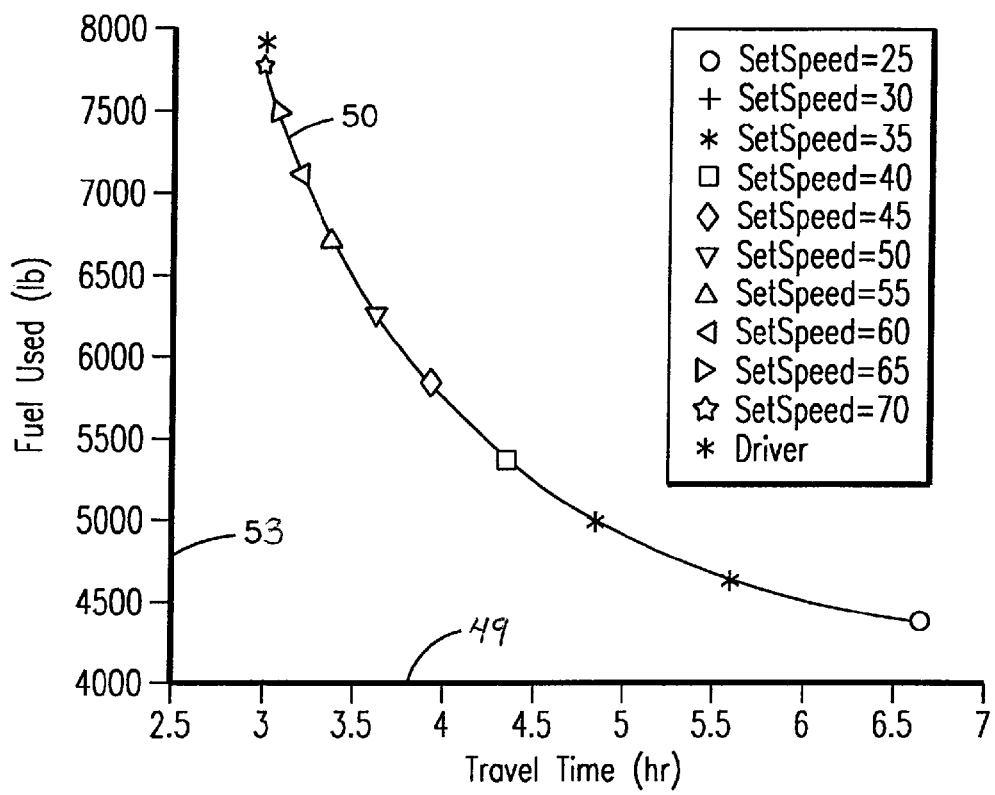
FIG. 4 depicts an exemplary embodiment of a fuel-use/travel time curve.

In operation, the locomotive 42 will continuously monitor system efficiency and continuously update the trip plan based on the actual efficiency measured, whenever such an update would improve trip performance. Re-planning computations may be carried out entirely within the locomotive(s) or fully or partially moved to a remote location, such as dispatch or wayside processing facilities where wireless technology is used to communicate the plans to the locomotive 42. The present invention may also generate efficiency trends that can be used to develop locomotive fleet data regarding efficiency transfer functions. The fleet-wide data may be used when determining the initial trip plan, and may be used for network-wide optimization tradeoff when considering locations of a plurality of trains. For example, the travel-time fuel use tradeoff curve as illustrated in FIG. 4 reflects a capability of a train on a particular route at a current time, updated from ensemble averages collected for many similar trains on the same route. Thus, a central dispatch facility collecting curves like FIG. 4 from many locomotives could use that information to better coordinate overall train movements to achieve a system-wide advantage in fuel use or throughput.

Many events in daily operations can lead to a need to generate or modify a currently executing plan, where it desired to keep the same trip objectives, for when a train is not on schedule for planned meet or pass with another train and it needs to make up time. Using the actual speed, power and location of the locomotive, a comparison is made between a planned arrival time and the currently estimated (predicted) arrival time 25. Based on a difference in the times, as well as the difference in parameters (detected or changed by dispatch or the operator), the plan is adjusted 26. This adjustment may be made automatically following a railroad company's desire for how such departures from plan should be handled or manually propose alternatives for the on-board operator and dispatcher to jointly decide the best way to get back on plan. Whenever a plan is updated but where the original objectives, such as but not limited to arrival time remain the same, additional changes may be factored in concurrently, e.g. new future speed limit changes, which could affect the feasibility of ever recovering the original plan. In such instances if the original trip plan cannot be maintained, or in other words the train is unable to meet the original trip plan objectives, as discussed herein other trip plan(s) may be presented to the operator and/or remote facility, or dispatch.

A re-plan may also be made when it is desired to change the original objectives. Such re-planning can be done at either fixed preplanned times, manually at the discretion of the operator or dispatcher, or autonomously when predefined limits, such a train operating limits, are exceeded. For example, if the current plan execution is running late by more than a specified threshold, such as thirty minutes, the present invention can re-plan the trip to accommodate the delay at expense of increased fuel as described above or to alert the operator and dispatcher how much of the time can be made up at all (i.e. what minimum time to go or the maximum fuel that can be saved within a time constraint). Other triggers for re-plan can also be envisioned based on fuel consumed or the health of the power consist, including but not limited time of arrival, loss of horsepower due to equipment failure and/or equipment temporary malfunction (such as operating too hot or too cold), and/or detection of gross setup errors, such in the assumed train load. That is, if the change reflects impairment in the locomotive performance for the current trip, these may be factored into the models and/or equations used in the optimization.

Changes in plan objectives can also arise from a need to coordinate events where the plan for one train compromises the ability of another train to meet objectives and arbitration at a different level, e.g. the dispatch office is required. For example, the coordination of meets and passes may be further optimized through train-to-train communications. Thus, as an example, if a train knows that it is behind in reaching a location for a meet and/or pass, communications from the other train can notify the late train (and/or dispatch). The operator can then enter information pertaining to being late into the present invention wherein the present invention will recalculate the train's trip plan. The present invention can also be used at a high level, or network-level, to allow a dispatch to determine which train should slow down or speed up should a scheduled meet and/or pass time constraint may not be met. As discussed herein, this is accomplished by trains transmitting data to the dispatch to prioritize how each train should change its planning objective. A choice could depend either from schedule or fuel saving benefits, depending on the situation.

For any of the manually or automatically initiated re-plans, the present invention may present more than one trip plan to the operator. In an exemplary embodiment the present invention will present different profiles to the operator, allowing the operator to select the arrival time and understand the corresponding fuel and/or emission impact. Such information can also be provided to the dispatch for similar consideration, either as a simple list of alternatives or as a plurality of tradeoff curves such as illustrated in FIG. 4.

The present invention has the ability of learning and adapting to key changes in the train and power consist which can be incorporated either in the current plan and/or for future plans. For example, one of the triggers discussed above is loss of horsepower. When building up horsepower over time, either after a loss of horsepower or when beginning a trip, transition logic is utilized to determine when desired horsepower is achieved. This information can be saved in the locomotive database 61 for use in optimizing either future trips or the current trip should loss of horsepower occur again.

Figure 3:
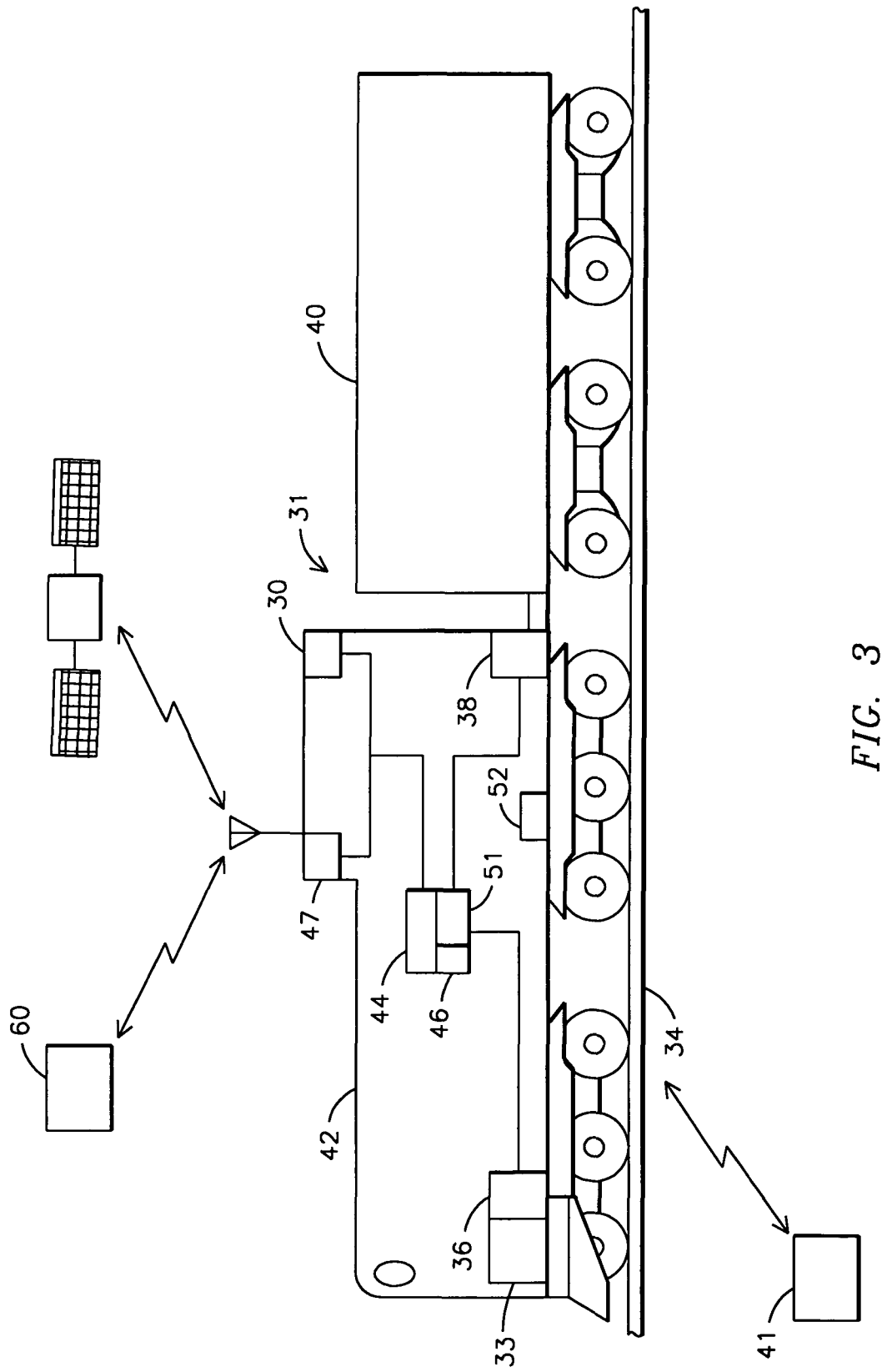
FIG. 3 depicts an exemplary embodiment of elements of an exemplary embodiment of the present invention.

FIG. 3 depicts an exemplary embodiment of elements of the present invention. A locator element 30 to determine a location of the train 31 is provided. The locator element 30 can be a GPS sensor, or a system of sensors, that determine a location of the train 31. Examples of such other systems may include, but are not limited to, wayside devices, such as radio frequency automatic equipment identification (RF AEI) Tags, dispatch, and/or video determination. Another system may include the tachometer(s) aboard a locomotive and distance calculations from a reference point. As discussed previously, a wireless communication system 47 may also be provided to allow for communications between trains and/or with a remote location, such as dispatch. Information about travel locations may also be transferred from other trains.

A track characterization element 33 to provide information about a track, principally grade and elevation and curvature information, is also provided. The track characterization element 33 may include an on-board track integrity database 36. Sensors 38 are used to measure a tractive effort 40 being hauled by the locomotive consist 42, throttle setting of the locomotive consist 42, locomotive consist 42 configuration information, speed of the locomotive consist 42, individual locomotive configuration, individual locomotive capability, etc. In an exemplary embodiment the locomotive consist 42 configuration information may be loaded without the use of a sensor 38, but is input by other approaches as discussed above. Furthermore, the health of the locomotives in the consist may also be considered. For example, if one locomotive in the consist is unable to operate above power notch level 5, this information is used when optimizing the trip plan.

Information from the locator element may also be used to determine an appropriate arrival time of the train 31. For example, if there is a train 31 moving along a track 34 towards a destination and no train is following behind it, and the train has no fixed arrival deadline to adhere to, the locator element, including but not limited to radio frequency automatic equipment identification (RF AEI) Tags, dispatch, and/or video determination, may be used to gage the exact location of the train 31. Furthermore, inputs from these signaling systems may be used to adjust the train speed. Using the on-board track database, discussed below, and the locator element, such as GPS, the present invention can adjust the operator interface to reflect the signaling system state at the given locomotive location. In a situation where signal states would indicate restrictive speeds ahead, the planner may elect to slow the train to conserve fuel consumption.

Information from the locator element 30 may also be used to change planning objectives as a function of distance to destination. For example, owing to inevitable uncertainties about congestion along the route, "faster" time objectives on the early part of a route may be employed as hedge against delays that statistically occur later. If it happens on a particular trip that delays do not occur, the objectives on a latter part of the journey can be modified to exploit the built-in slack time that was banked earlier, and thereby recover some fuel efficiency. A similar strategy could be invoked with respect to emissions restrictive objectives, e.g. approaching an urban area.

As an example of the hedging strategy, if a trip is planned from New York to Chicago, the system may have an option to operate the train slower at either the beginning of the trip or at the middle of the trip or at the end of the trip. The present invention would optimize the trip plan to allow for slower operation at the end of the trip since unknown constraints, such as but not limited to weather conditions, track maintenance, etc., may develop and become known during the trip. As another consideration, if traditionally congested areas are known, the plan is developed with an option to have more flexibility around these traditionally congested regions. Therefore, the present invention may also consider weighting/penalty as a function of time/distance into the future and/or based on known/past experience. Those skilled in the art will readily recognize that such planning and re-planning to take into consideration weather conditions, track conditions, other trains on the track, etc., may be taking into consideration at any time during the trip wherein the trip plan is adjust accordingly.

FIG. 3 further discloses other elements that may be part of the present invention. A processor 44 is provided that is operable to receive information from the locator element 30, track characterizing element 33, and sensors 38. An algorithm 46 operates within the processor 44. The algorithm 46 is used to compute an optimized trip plan based on parameters involving the locomotive 42, train 31, track 34, and objectives of the mission as described above. In an exemplary embodiment, the trip plan is established based on models for train behavior as the train 31 moves along the track 34 as a solution of non-linear differential equations derived from physics with simplifying assumptions that are provided in the algorithm. The algorithm 46 has access to the information from the locator element 30, track characterizing element 33 and/or sensors 38 to create a trip plan minimizing fuel consumption of a locomotive consist 42, minimizing emissions of a locomotive consist 42, establishing a desired trip time, and/or ensuring proper crew operating time aboard the locomotive consist 42. In an exemplary embodiment, a driver, or controller element, 51 is also provided. As discussed herein the controller element 51 is used for controlling the train as it follows the trip plan. In an exemplary embodiment discussed further herein, the controller element 51 makes train operating decisions autonomously. In another exemplary embodiment the operator may be involved with directing the train to follow the trip plan.

A requirement of the present invention is the ability to initially create and quickly modify on the fly any plan that is being executed. This includes creating the initial plan when a long distance is involved, owing to the complexity of the plan optimization algorithm. When a total length of a trip profile exceeds a given distance, an algorithm 46 may be used to segment the mission wherein the mission may be divided by waypoints. Though only a single algorithm 46 is discussed, those skilled in the art will readily recognize that more than one algorithm may be used where the algorithms may be connected together. The waypoint may include natural locations where the train 31 stops, such as, but not limited to, sidings where a meet with opposing traffic, or pass with a train behind the current train is scheduled to occur on single-track rail, or at yard sidings or industry where cars are to be picked up and set out, and locations of planned work. At such waypoints, the train 31 may be required to be at the location at a scheduled time and be stopped or moving with speed in a specified range. The time duration from arrival to departure at waypoints is called dwell time.

In an exemplary embodiment, the present invention is able to break down a longer trip into smaller segments in a special systematic way. Each segment can be somewhat arbitrary in length, but is typically picked at a natural location such as a stop or significant speed restriction, or at key mileposts that define junctions with other routes. Given a partition, or segment, selected in this way, a driving profile is created for each segment of track as a function of travel time taken as an independent variable, such as shown in FIG. 4. The fuel used/travel-time tradeoff associated with each segment can be computed prior to the train 31 reaching that segment of track. A total trip plan can be created from the driving profiles created for each segment. The invention distributes travel time amongst all the segments of the trip in an optimal way so that the total trip time required is satisfied and total fuel consumed over all the segments is as small as possible. An exemplary 3 segment trip is disclosed in FIG. 6 and discussed below. Those skilled in the art will recognize however, through segments are discussed, the trip plan may comprise a single segment representing the complete trip.

FIG. 4 depicts an exemplary embodiment of a fuel-use/travel time curve. As mentioned previously, such a curve 50 is created when calculating an optimal trip profile for various travel times for each segment. That is, for a given travel time 49, fuel used 53 is the result of a detailed driving profile computed as described above. Once travel times for each segment are allocated, a power/speed plan is determined for each segment from the previously computed solutions. If there are any waypoint constraints on speed between the segments, such as, but not limited to, a change in a speed limit, they are matched up during creation of the optimal trip profile. If speed restrictions change in only a single segment, the fuel use/travel-time curve 50 has to be re-computed for only the segment changed. This reduces time for having to re-calculate more parts, or segments, of the trip. If the locomotive consist or train changes significantly along the route, e.g. from loss of a locomotive or pickup or set-out of cars, then driving profiles for all subsequent segments must be recomputed creating new instances of the curve 50. These new curves 50 would then be used along with new schedule objectives to plan the remaining trip.

Once a trip plan is created as discussed above, a trajectory of speed and power versus distance is used to reach a destination with minimum fuel and/or emissions at the required trip time. There are several ways in which to execute the trip plan. As provided below in more detail, in one exemplary embodiment, a coaching mode the present invention displays information to the operator for the operator to follow to achieve the required power and speed determined according to the optimal trip plan. In this mode, the operating information is suggested operating conditions that the operator should use. In another exemplary embodiment, acceleration and maintaining a constant speed are performed by the present invention. However, when the train 31 must be slowed, the operator is responsible for applying a braking system 52. In another exemplary embodiment, the present invention commands power and braking as required to follow the desired speed-distance path.

Feedback control strategies are used to provide corrections to the power control sequence in the profile to correct for such events as, but not limited to, train load variations caused by fluctuating head winds and/or tail winds. Another such error may be caused by an error in train parameters, such as, but not limited to, train mass and/or drag, when compared to assumptions in the optimized trip plan. A third type of error may occur with information contained in the track database 36. Another possible error may involve un-modeled performance differences due to the locomotive engine, traction motor thermal deration and/or other factors. Feedback control strategies compare the actual speed as a function of position to the speed in the desired optimal profile. Based on this difference, a correction to the optimal power profile is added to drive the actual velocity toward the optimal profile. To assure stable regulation, a compensation algorithm may be provided which filters the feedback speeds into power corrections to assure closed-performance stability is assured. Compensation may include standard dynamic compensation as used by those skilled in the art of control system design to meet performance objectives.

The present invention allows the simplest and therefore fastest means to accommodate changes in trip objectives, which is the rule, rather than the exception in railroad operations. In an exemplary embodiment to determine the fuel-optimal trip from point A to point B where there are stops along the way, and for updating the trip for the remainder of the trip once the trip has begun, a sub-optimal decomposition method is usable for finding an optimal trip profile. Using modeling methods the computation method can find the trip plan with specified travel time and initial and final speeds, so as to satisfy all the speed limits and locomotive capability constraints when there are stops. Though the following discussion is directed towards optimizing fuel use, it can also be applied to optimize other factors, such as, but not limited to, emissions, schedule, crew comfort, and load impact. The method may be used at the outset in developing a trip plan, and more importantly to adapting to changes in objectives after initiating a trip.

Figure 5:
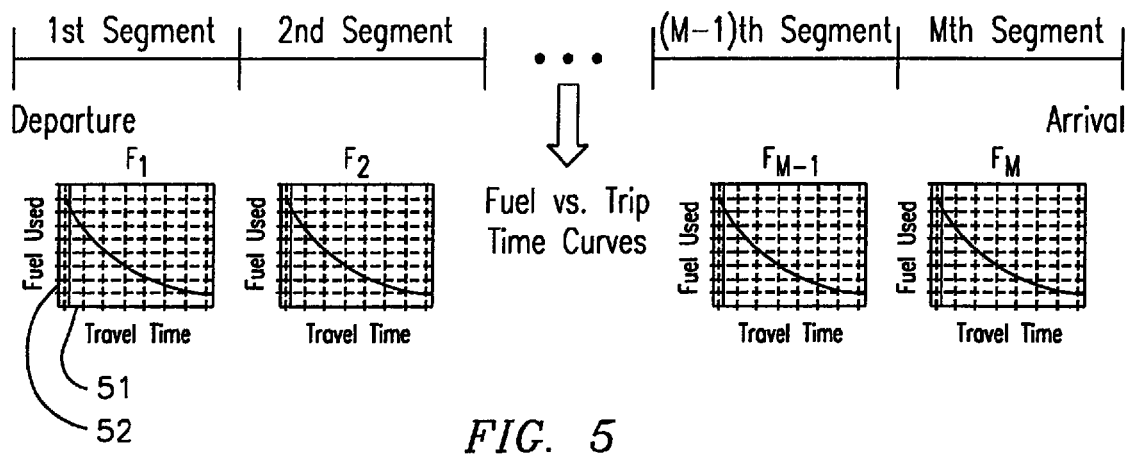
FIG. 5 depicts an exemplary embodiment of segmentation decomposition for trip planning.
Figure 6:
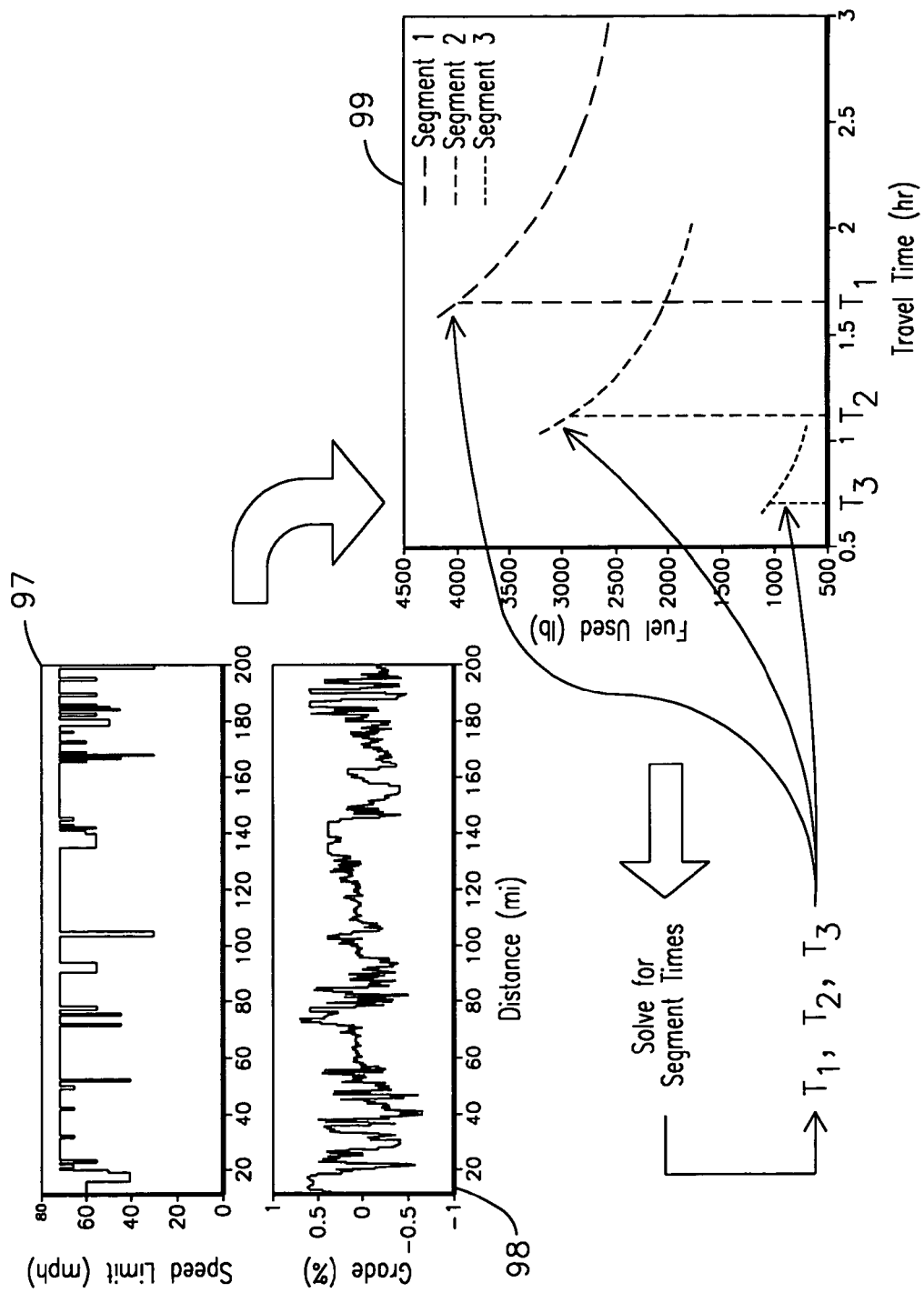
FIG. 6 depicts an exemplary embodiment of a segmentation example.

As discussed herein, the present invention may employ a setup as illustrated in the exemplary flow chart depicted in FIG. 5, and as an exemplary 3 segment example depicted in detail in FIG. 6. As illustrated, the trip may be broken into two or more segments, T1, T2, and T3. Though as discussed herein, it is possible to consider the trip as a single segment. As discussed herein, the segment boundaries may not result in equal segments. Instead the segments use natural or mission specific boundaries. Optimal trip plans are pre-computed for each segment. If fuel use versus trip time is the trip object to be met, fuel versus trip time curves are built for each segment. As discussed herein, the curves may be based on other factors, wherein the factors are objectives to be met with a trip plan. When trip time is the parameter being determined, trip time for each segment is computed while satisfying the overall trip time constraints. FIG. 6 illustrates speed limits for an exemplary 3 segment 200 mile trip 97. Further illustrated are grade changes over the 200 mile trip 98. A combined chart 99 illustrating curves for each segment of the trip of fuel used over the travel time is also shown.

Using the optimal control setup described previously, the present computation method can find the trip plan with specified travel time and initial and final speeds, so as to satisfy all the speed limits and locomotive capability constraints when there are stops. Though the following detailed discussion is directed towards optimizing fuel use, it can also be applied to optimize other factors as discussed herein, such as, but not limited to, emissions. A key flexibility is to accommodate desired dwell time at stops and to consider constraints on earliest arrival and departure at a location as may be required, for example, in single-track operations where the time to be in or get by a siding is critical.

The present invention finds a fuel-optimal trip from distance $D_0$ to $D_M$, traveled in time T, with M−1 intermediate stops at $D_1, \ldots, D_{M-1}$, and with the arrival and departure times at these stops constrained by $$t_{min}(i) \leq t_{arr}(D_i) \leq t_{max}(i) - \Delta t_i$$

$$t_{arr}(D_i) + \Delta t_i \leq t_{dep}(D_i) \leq t_{max}(i) \quad i=1, \ldots, M-1$$

where $t_{arr}(D_i)$, $t_{dep}(D_i)$, and $\Delta t_i$ are the arrival, departure, and minimum stop time at the $i^{th}$ stop, respectively. Assuming that fuel-optimality implies minimizing stop time, therefore $t_{dep}(D_i) = t_{arr}(D_i) + \Delta t_i$ which eliminates the second inequality above. Suppose for each $i=1, \ldots, M$, the fuel-optimal trip from $D_{i-1}$ to $D_i$ for travel time t, $T_{min}(i) \leq t \leq T_{max}(i)$ is known. Let $F_i(t)$ be the fuel-use corresponding to this trip. If the travel time from $D_{j-1}$ to $D_j$ is denoted $T_j$, then the arrival time at $D_i$ is given by $$t_{arr}(D_i) = \sum_{j=1}^{i}(T_j + \Delta t_{j-1})$$

where $\Delta t_0$ is defined to be zero. The fuel-optimal trip from $D_0$ to $D_M$ for travel time T is then obtained by finding $T_i$, $i=1, \ldots, M$, which minimize $$\sum_{i=1}^{M} F_i(T_i) \quad T_{min}(i) \leq T_i \leq T_{max}(i)$$

subject to $$t_{min}(i) \leq \sum_{j=1}^{i}(T_j + \Delta t_{j-1}) \leq t_{max}(i) - \Delta t_i \quad i=1, \ldots, M-1$$

$$\sum_{j=1}^{M}(T_j + \Delta t_{j-1}) = T$$

Once a trip is underway, the issue is re-determining the fuel-optimal solution for the remainder of a trip (originally from $D_0$ to $D_M$ in time T) as the trip is traveled, but where disturbances preclude following the fuel-optimal solution. Let the current distance and speed be x and v, respectively, where $D_{i-1} < x \leq D_i$. Also, let the current time since the beginning of the trip be $t_{act}$. Then the fuel-optimal solution for the remainder of the trip from x to $D_M$, which retains the original arrival time at $D_M$, is obtained by finding $\tilde{T}_i$, $T_j$, $j=i+1, \ldots M$, which minimize $$\tilde{F}_i(\tilde{T}_i, x, v) + \sum_{j=i+1}^{M} F_j(T_j)$$

subject to $$t_{min}(i) \leq t_{act} + \tilde{T}_i \leq t_{max}(i) - \Delta t_i$$

$$t_{min}(k) \leq t_{act} + \tilde{T}_i + \sum_{j=i+1}^{k}(T_j + \Delta t_{j-1}) \leq t_{max}(k) - \Delta t_k$$

-continued $$k = i+1, \ldots, M-1$$

$$t_{act} + \tilde{T}_i + \sum_{j=i+1}^{M}(T_j + \Delta t_{j-1}) = T$$

Here, $\tilde{F}_i(t,x,v)$ is the fuel-used of the optimal trip from x to $D_i$, traveled in time t, with initial speed at x of v.

As discussed above, an exemplary way to enable more efficient re-planning is to construct the optimal solution for a stop-to-stop trip from partitioned segments. For the trip from $D_{i-1}$ to $D_i$, with travel time $T_i$, choose a set of intermediate points $D_{ij}$, $j=1, \ldots, N_i-1$. Let $D_{i0}=D_{i-1}$ and $D_{iN_i}=D_i$. Then express the fuel-use for the optimal trip from $D_{i-1}$ to $D_i$ as $$F_i(t) = \sum_{j=1}^{N_i} f_{ij}(t_{ij} - t_{i,j-1}, v_{i,j-1}, v_{ij})$$

where $f_{ij}(t, v_{i,j-1}, v_{ij})$ is the fuel-use for the optimal trip from $D_{i,j-1}$ to $D_{ij}$, traveled in time t, with initial and final speeds of $v_{i,j-1}$ and $v_{ij}$. Furthermore, $t_{ij}$ is the time in the optimal trip corresponding to distance $D_{ij}$. By definition, $t_{iN_i} - t_{i0} = T_i$. Since the train is stopped at $D_{i0}$ and $D_{iN_i}$, $V_{i0} = V_{iN_i} = 0$.

The above expression enables the function $F_i(t)$ to be alternatively determined by first determining the functions $f_{ij}(\bullet), 1 \leq j \leq N_i$, then finding $\tau_{ij}$, $1 \leq j \leq N_i$ and $v_{ij}, 1 \leq j < N_i$, which minimize $$F_i(t) = \sum_{j=1}^{N_i} f_{ij}(\tau_{ij}, v_{i,j-1}, v_{ij})$$

subject to $$\sum_{j=1}^{N_i} \tau_{ij} = T_i$$

$$v_{min}(i,j) \leq v_{ij} \leq v_{max}(i,j) \quad j=1, \ldots, N_i - 1$$

$$v_{i0} = v_{iN_i} = 0$$

By choosing $D_{ij}$ (e.g., at speed restrictions or meeting points), $V_{max}(i,j) - v_{min}(i,j)$ can be minimized, thus minimizing the domain over which $f_{ij}(\ )$ needs to be known.

Based on the partitioning above, a simpler suboptimal re-planning approach than that described above is to restrict re-planning to times when the train is at distance points $D_{ij}, 1 \leq i \leq M, 1 \leq j \leq N_i$. At point $D_{ij}$, the new optimal trip from $D_{ij}$ to $D_M$ can be determined by finding $\tau_{ik}$, $j < k \leq N_i$, $v_{ik}$, $j < k < N_i$, and $\tau_{mn}$, $i < m \leq M, 1 \leq n \leq N_m$, $v_{mn}$, $i < m \leq M, 1 \leq n < N_m$, which minimize $$\sum_{k=j+1}^{N_i} f_{ik}(\tau_{ik}, v_{i,k-1}, v_{ik}) + \sum_{m=i+1}^{M} \sum_{n=1}^{N_m} f_{mn}(\tau_{mn}, v_{m,n-1}, v_{mn})$$

subject to $$t_{min}(i) \leq t_{act} + \sum_{k=j+1}^{N_i} \tau_{ik} \leq t_{max}(i) - \Delta t_i$$

-continued $$t_{\min}(n) \le t_{act} + \sum_{k=j+1}^{N_j} \tau_{ik} + \sum_{m=i+1}^{n} (T_m + \Delta t_{m-1}) \le t_{\max}(n) - \Delta t_n$$

$$n = i+1, \ldots, M-1$$

$$t_{act} + \sum_{k=j+1}^{N_j} \tau_{ik} + \sum_{m=i+1}^{M} (T_m + \Delta t_{m-1}) = T$$

where $$T_m = \sum_{n=1}^{N_m} \tau_{mn}$$

A further simplification is obtained by waiting on the re-computation of $T_m$, i<m≤M, until distance point $D_i$ is reached. In this way, at points $D_{ij}$ between $D_{i-1}$ and $D_i$, the minimization above needs only be performed over $\tau_{ik}$, j≤k≤$N_i$, $v_{ik}$, j≤k≤$N_i$. $T_i$ is increased as needed to accommodate any longer actual travel time from $D_{i-1}$ to $D_{ij}$ than planned. This increase is later compensated, if possible, by the re-computation of $T_m$, i≤m≤M, at distance point $D_i$.

With respect to the closed-loop configuration disclosed above, the total input energy required to move a train 31 from point A to point B consists of the sum of four components, specifically difference in kinetic energy between points A and B; difference in potential energy between points A and B; energy loss due to friction and other drag losses; and energy dissipated by the application of brakes. Assuming the start and end speeds to be equal (e.g., stationary), the first component is zero. Furthermore, the second component is independent of driving strategy. Thus, it suffices to minimize the sum of the last two components.

Following a constant speed profile minimizes drag loss. Following a constant speed profile also minimizes total energy input when braking is not needed to maintain constant speed. However, if braking is required to maintain constant speed, applying braking just to maintain constant speed will most likely increase total required energy because of the need to replenish the energy dissipated by the brakes. A possibility exists that some braking may actually reduce total energy usage if the additional brake loss is more than offset by the resultant decrease in drag loss caused by braking, by reducing speed variation.

After completing a re-plan from the collection of events described above, the new optimal notch/speed plan can be followed using the closed loop control described herein. However, in some situations there may not be enough time to carry out the segment decomposed planning described above, and particularly when there are critical speed restrictions that must be respected, an alternative is needed. The present invention accomplishes this with an algorithm referred to as "smart cruise control". The smart cruise control algorithm is an efficient way to generate, on the fly, an energy-efficient (hence fuel-efficient) sub-optimal prescription for driving the train 31 over a known terrain. This algorithm assumes knowledge of the position of the train 31 along the track 34 at all times, as well as knowledge of the grade and curvature of the track versus position. The method relies on a point-mass model for the motion of the train 31, whose parameters may be adaptively estimated from online measurements of train motion as described earlier.

The smart cruise control algorithm has three principal components, specifically a modified speed limit profile that serves as an energy-efficient guide around speed limit reductions; an ideal throttle or dynamic brake setting profile that attempts to balance between minimizing speed variation and braking; and a mechanism for combining the latter two components to produce a notch command, employing a speed feedback loop to compensate for mismatches of modeled parameters when compared to reality parameters. Smart cruise control can accommodate strategies in the present invention that do no active braking (i.e. the driver is signaled and assumed to provide the requisite braking) or a variant that does active braking.

With respect to the cruise control algorithm that does not control dynamic braking, the three exemplary components are a modified speed limit profile that serves as an energy-efficient guide around speed limit reductions, a notification signal directed to notify the operator when braking should be applied, an ideal throttle profile that attempts to balance between minimizing speed variations and notifying the operator to apply braking, a mechanism employing a feedback loop to compensate for mismatches of model parameters to reality parameters.

Also included in the present invention is an approach to identify key parameter values of the train 31. For example, with respect to estimating train mass, a Kalman filter and a recursive least-squares approach may be utilized to detect errors that may develop over time.

Figure 7:
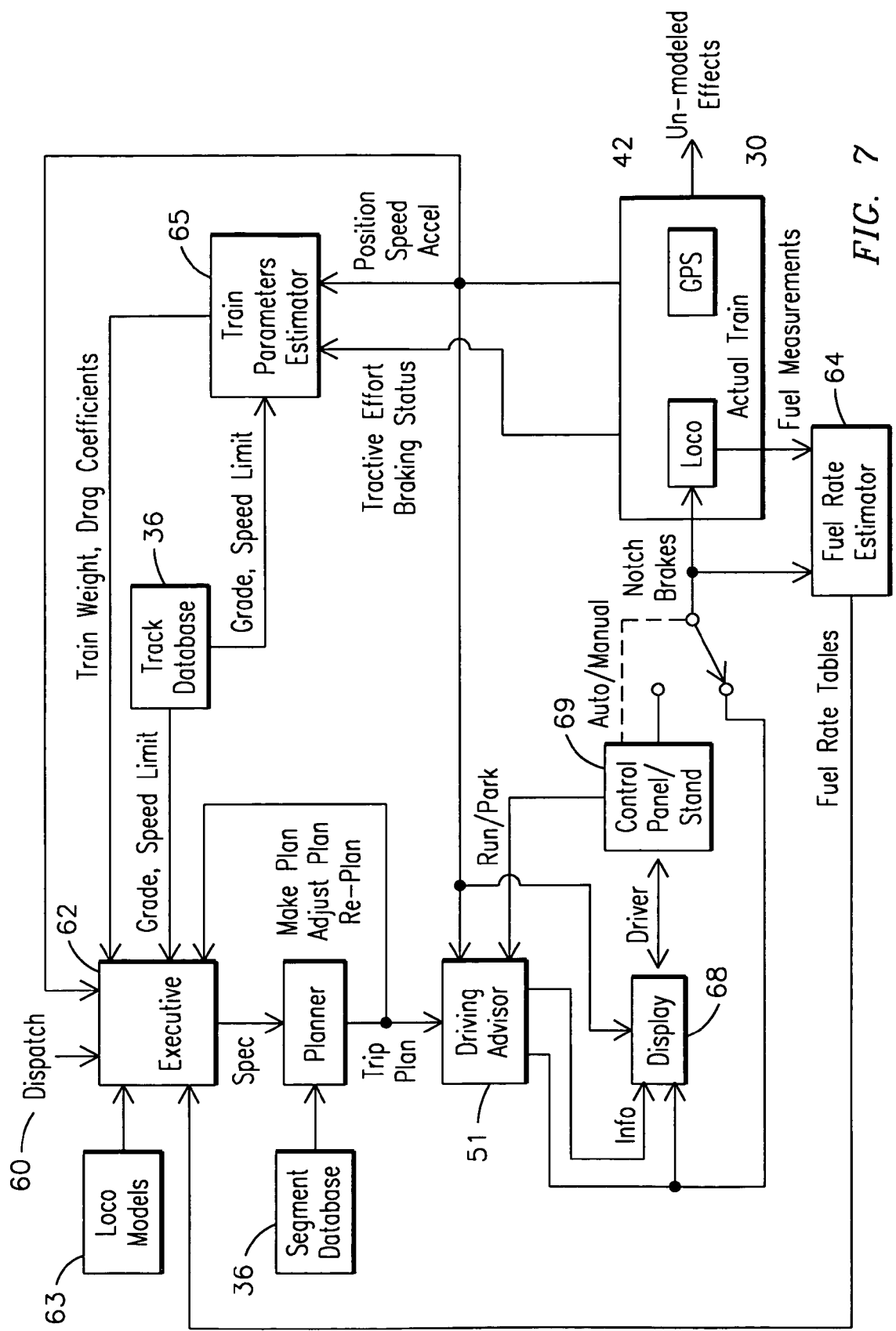
FIG. 7 depicts an exemplary flow chart of an exemplary embodiment of the present invention.

FIG. 7 depicts an exemplary flow chart of the present invention. As discussed previously, a remote facility, such as a dispatch 60 can provide information to the present invention. As illustrated, such information is provided to an executive control element 62. Also supplied to the executive control element 62 is locomotive modeling information database 63, information from a track database 36 such as, but not limited to, track grade information and speed limit information, estimated train parameters such as, but not limited to, train weight and drag coefficients, and fuel rate tables from a fuel rate estimator 64. The executive control element 62 supplies information to the planner 12, which is disclosed in more detail in FIG. 1. Once a trip plan has been calculated, the plan is supplied to a driving advisor, driver or controller element 51. The trip plan is also supplied to the executive control element 62 so that it can compare the trip when other new data is provided.

As discussed above, the driving advisor 51 can automatically set a notch power, either a pre-established notch setting or an optimum continuous notch power. In addition to supplying a speed command to the locomotive 31, a display 68 is provided so that the operator can view what the planner has recommended. The operator also has access to a control panel 69. Through the control panel 69 the operator can decide whether to apply the notch power recommended. Towards this end, the operator may limit a targeted or recommended power. That is, at any time the operator always has final authority over what power setting the locomotive consist will operate at. This includes deciding whether to apply braking if the trip plan recommends slowing the train 31. For example, if operating in dark territory, or where information from wayside equipment cannot electronically transmit information to a train and instead the operator views visual signals from the wayside equipment, the operator inputs commands based on information contained in track database and visual signals from the wayside equipment. Based on how the train 31 is functioning, information regarding fuel measurement is supplied to the fuel rate estimator 64. Since direct measurement of fuel flows is not typically available in a locomotive consist, all information on fuel consumed so far within a trip and projections into the future following optimal plans is carried out using calibrated physics models such as those used in developing the optimal plans. For example, such predictions may include but are not limited to, the use of measured gross horse-power and known fuel characteristics to derive the cumulative fuel used.

The train 31 also has a locator device 30 such as a GPS sensor, as discussed above. Information is supplied to the train parameters estimator 65. Such information may include, but is not limited to, GPS sensor data, tractive/braking effort data, braking status data, speed and any changes in speed data. With information regarding grade and speed limit information, train weight and drag coefficients information is supplied to the executive control element 62.

The present invention may also allow for the use of continuously variable power throughout the optimization planning and closed loop control implementation. In a conventional locomotive, power is typically quantized to eight discrete levels. Modern locomotives can realize continuous variation in horsepower which may be incorporated into the previously described optimization methods. With continuous power, the locomotive 42 can further optimize operating conditions, e.g., by minimizing auxiliary loads and power transmission losses, and fine tuning engine horsepower regions of optimum efficiency, or to points of increased emissions margins. Example include, but are not limited to, minimizing cooling system losses, adjusting alternator voltages, adjusting engine speeds, and reducing number of powered axles. Further, the locomotive 42 may use the on-board track database 36 and the forecasted performance requirements to minimize auxiliary loads and power transmission losses to provide optimum efficiency for the target fuel consumption/emissions. Examples include, but are not limited to, reducing a number of powered axles on flat terrain and pre-cooling the locomotive engine prior to entering a tunnel.

The present invention may also use the on-board track database 36 and the forecasted performance to adjust the locomotive performance, such as to insure that the train has sufficient speed as it approaches a hill and/or tunnel. For example, this could be expressed as a speed constraint at a particular location that becomes part of the optimal plan generation created solving the equation (OP). Additionally, the present invention may incorporate train-handling rules, such as, but not limited to, tractive effort ramp rates, maximum braking effort ramp rates. These may incorporated directly into the formulation for optimum trip profile or alternatively incorporated into the closed loop regulator used to control power application to achieve the target speed.

In a preferred embodiment the present invention is only installed on a lead locomotive of the train consist. Even though the present invention is not dependant on data or interactions with other locomotives, it may be integrated with a consist manager, as disclosed in U.S. Pat. No. 6,691,957 and patent application Ser. No. 10/429,596 (owned by the Assignee and both incorporated by reference), functionality and/or a consist optimizer functionality to improve efficiency. Interaction with multiple trains is not precluded as illustrated by the example of dispatch arbitrating two "independently optimized" trains described herein.

Trains with distributed power systems can be operated in different modes. One mode is where all locomotives in the train operate at the same notch command. So if the lead locomotive is commanding motoring-N8, all units in the train will be commanded to generate motoring-N8 power. Another mode of operation is "independent" control. In this mode, locomotives or sets of locomotives distributed throughout the train can be operated at different motoring or braking powers. For example, as a train crests a mountaintop, the lead locomotives (on the down slope of mountain) may be placed in braking, while the locomotives in the middle or at the end of the train (on the up slope of mountain) may be in motoring. This is done to minimize tensile forces on the mechanical couplers that connect the railcars and locomotives. Traditionally, operating the distributed power system in "independent" mode required the operator to manually command each remote locomotive or set of locomotives via a display in the lead locomotive. Using the physics based planning model, train set-up information, on-board track database, on-board operating rules, location determination system, real-time closed loop power/brake control, and sensor feedback, the system shall automatically operate the distributed power system in "independent" mode.

When operating in distributed power, the operator in a lead locomotive can control operating functions of remote locomotives in the remote consists via a control system, such as a distributed power control element. Thus when operating in distributed power, the operator can command each locomotive consist to operate at a different notch power level (or one consist could be in motoring and other could be in braking) wherein each individual locomotive in the locomotive consist operates at the same notch power. In an exemplary embodiment, with the present invention installed on the train, preferably in communication with the distributed power control element, when a notch power level for a remote locomotive consist is desired as recommended by the optimized trip plan, the present invention will communicate this power setting to the remote locomotive consists for implementation. As discussed below, the same is true regarding braking.

The present invention may be used with consists in which the locomotives are not contiguous, e.g., with 1 or more locomotives up front, others in the middle and at the rear for train. Such configurations are called distributed power wherein the standard connection between the locomotives is replaced by radio link or auxiliary cable to link the locomotives externally. When operating in distributed power, the operator in a lead locomotive can control operating functions of remote locomotives in the consist via a control system, such as a distributed power control element. In particular, when operating in distributed power, the operator can command each locomotive consist to operate at a different notch power level (or one consist could be in motoring and other could be in braking) wherein each individual in the locomotive consist operates at the same notch power.

In an exemplary embodiment, with the present invention installed on the train, preferably in communication with the distributed power control element, when a notch power level for a remote locomotive consist is desired as recommended by the optimized trip plan, the present invention will communicate this power setting to the remote locomotive consists for implementation. As discussed below, the same is true regarding braking. When operating with distributed power, the optimization problem previously described can be enhanced to allow additional degrees of freedom, in that each of the remote units can be independently controlled from the lead unit. The value of this is that additional objectives or constraints relating to in-train forces may be incorporated into the performance function, assuming the model to reflect the in-train forces is also included. Thus the present invention may include the use of multiple throttle controls to better manage in-train forces as well as fuel consumption and emissions.

In a train utilizing a consist manager, the lead locomotive in a locomotive consist may operate at a different notch power setting than other locomotives in that consist. The other locomotives in the consist operate at the same notch power setting. The present invention may be utilized in conjunction with the consist manager to command notch power settings for the locomotives in the consist. Thus based on the present invention, since the consist manager divides a locomotive consist into two groups, lead locomotive and trail units, the lead locomotive will be commanded to operate at a certain notch power and the trail locomotives are commanded to operate at another certain notch power. In an exemplary embodiment the distributed power control element may be the system and/or apparatus where this operation is housed.

Likewise, when a consist optimizer is used with a locomotive consist, the present invention can be used in conjunction with the consist optimizer to determine notch power for each locomotive in the locomotive consist. For example, suppose that a trip plan recommends a notch power setting of 4 for the locomotive consist. Based on the location of the train, the consist optimizer will take this information and then determine the notch power setting for each locomotive in the consist In this implementation, the efficiency of setting notch power settings over intra-train communication channels is improved. Furthermore, as discussed above, implementation of this configuration may be performed utilizing the distributed control system.

Furthermore, as discussed previously, the present invention may be used for continuous corrections and re-planning with respect to when the train consist uses braking based on upcoming items of interest, such as but not limited to railroad crossings, grade changes, approaching sidings, approaching depot yards, and approaching fuel stations where each locomotive in the consist may require a different braking option. For example, if the train is coming over a hill, the lead locomotive may have to enter a braking condition whereas the remote locomotives, having not reached the peak of the hill may have to remain in a motoring state.

Figure 8:
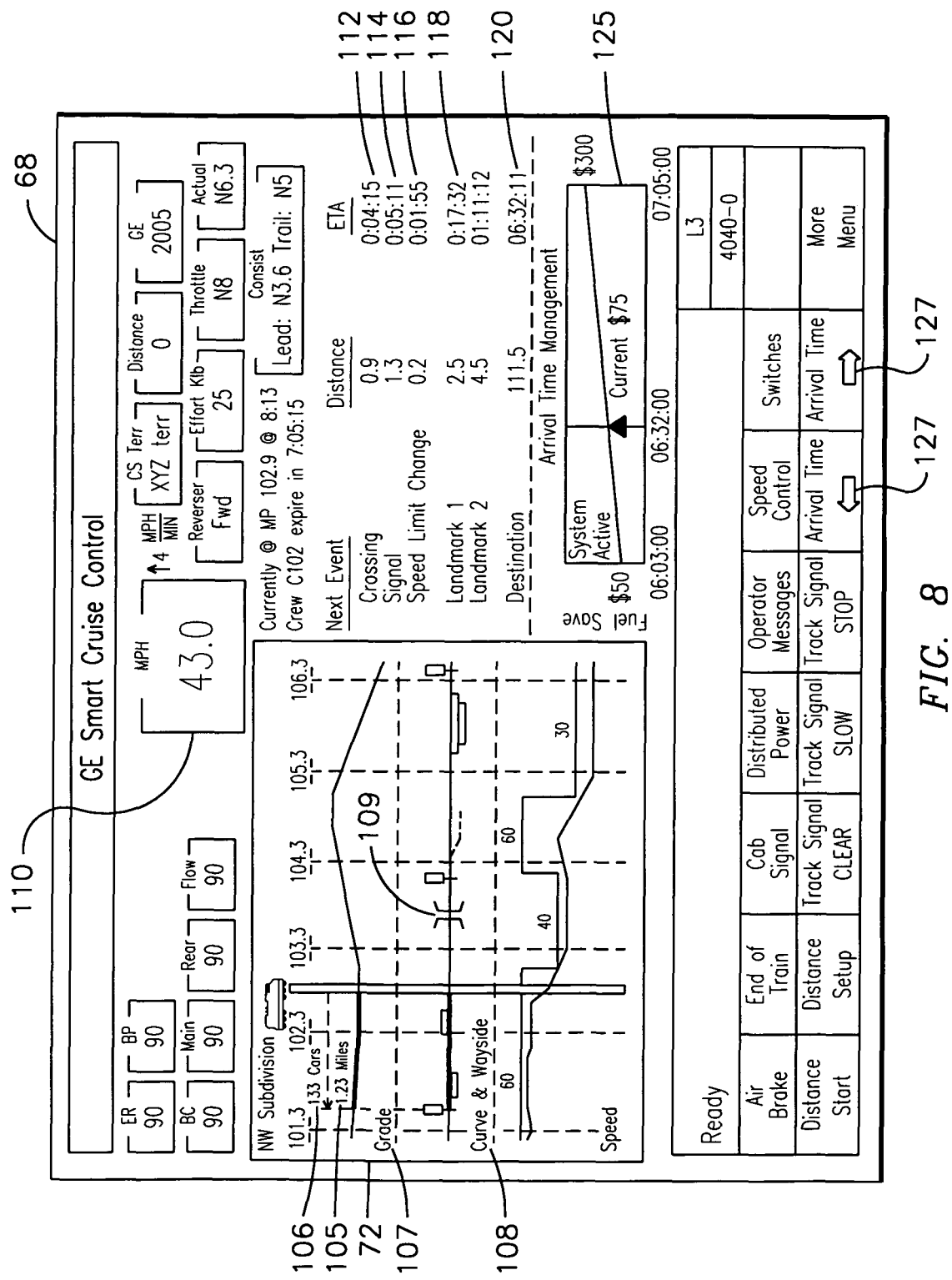
FIG. 8 depicts an exemplary illustration of a dynamic display for use by the operator.
Figure 9:
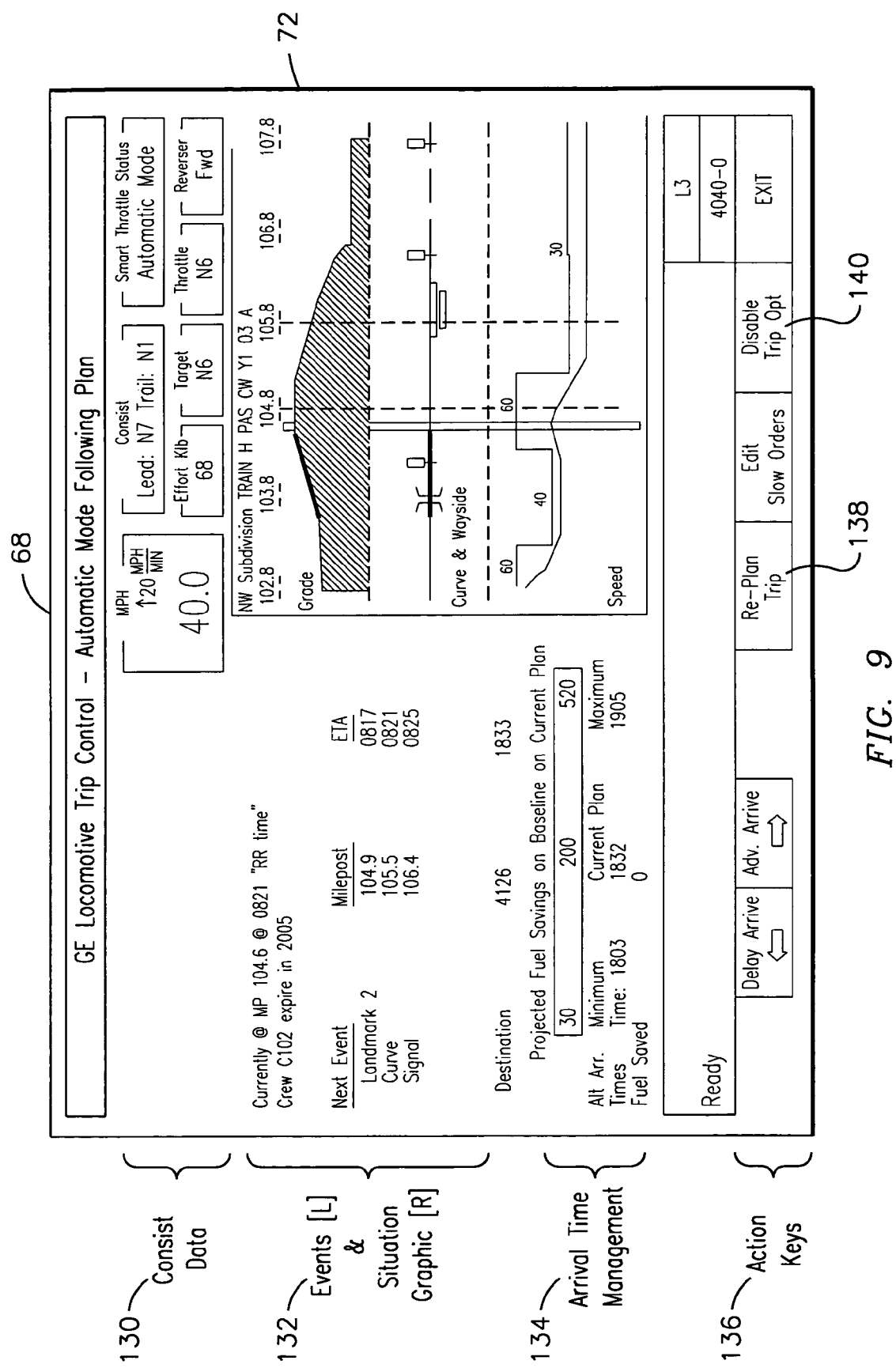
FIG. 9 depicts another exemplary illustration of a dynamic display for use by the operator.
Figure 10:
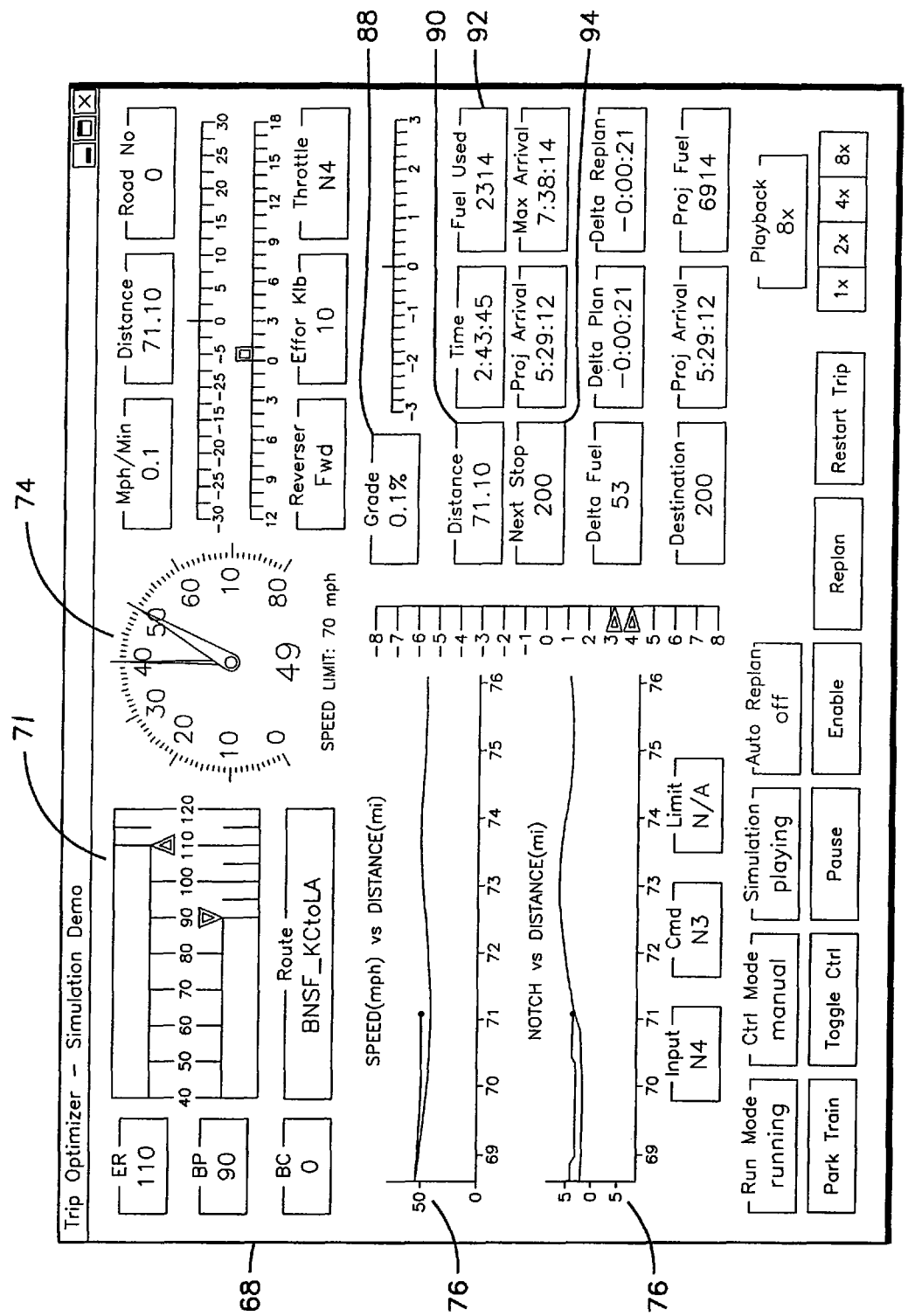
FIG. 10 depicts another exemplary illustration of a dynamic display for use by the operator.

FIGS. 8, 9 and 10 depict exemplary illustrations of dynamic displays for use by the operator. As provided, FIG. 8, a trip profile is provided 72. Within the profile a location 73 of the locomotive is provided. Such information as train length 105 and the number of cars 106 in the train is provided. Elements are also provided regarding track grade 107, curve and wayside elements 108, including bridge location 109, and train speed 110. The display 68 allows the operator to view such information and also see where the train is along the route. Information pertaining to distance and/or estimate time of arrival to such locations as crossings 112, signals 114, speed changes 116, landmarks 118, and destinations 120 is provided. An arrival time management tool 125 is also provided to allow the user to determine the fuel savings that is being realized during the trip. The operator has the ability to vary arrival times 127 and witness how this affects the fuel savings. As discussed herein, those skilled in the art will recognize that fuel saving is an exemplary example of only one objective that can be reviewed with a management tool. Towards this end, depending on the parameter being viewed, other parameters, discussed herein can be viewed and evaluated with a management tool that is visible to the operator. The operator is also provided information about how long the crew has been operating the train. In exemplary embodiments time and distance information may either be illustrated as the time and/or distance until a particular event and/or location or it may provide a total elapsed time.

As illustrated in FIG. 9 an exemplary display provides information about consist data 130, an events and situation graphic 132, an arrival time management tool 134, and action keys 136. Similar information as discussed above is provided in this display as well. This display 68 also provides action keys 138 to allow the operator to re-plan as well as to disengage 140 the present invention.

FIG. 10 depicts another exemplary embodiment of the display. Data typical of a modern locomotive including air-brake status 72, analog speedometer with digital inset 74, and information about tractive effort in pounds force (or traction amps for DC locomotives) is visible. An indicator 74 is provided to show the current optimal speed in the plan being executed as well as an accelerometer graphic to supplement the readout in mph/minute. Important new data for optimal plan execution is in the center of the screen, including a rolling strip graphic 76 with optimal speed and notch setting versus distance compared to the current history of these variables. In this exemplary embodiment, location of the train is derived using the locator element. As illustrated, the location is provided by identifying how far the train is away from its final destination, an absolute position, an initial destination, an intermediate point, and/or an operator input.

The strip chart provides a look-ahead to changes in speed required to follow the optimal plan, which is useful in manual control, and monitors plan versus actual during automatic control. As discussed herein, such as when in the coaching mode, the operator can either follow the notch or speed suggested by the present invention. The vertical bar gives a graphic of desired and actual notch, which are also displayed digitally below the strip chart. When continuous notch power is utilized, as discussed above, the display will simply round to closest discrete equivalent, the display may be an analog display so that an analog equivalent or a percentage or actual horse power/tractive effort is displayed.

Critical information on trip status is displayed on the screen, and shows the current grade the train is encountering 88, either by the lead locomotive, a location elsewhere along the train or an average over the train length. A distance traveled so far in the plan 90, cumulative fuel used 92, where or the distance away the next stop is planned 94, current and projected arrival time 96 expected time to be at next stop are also disclosed. The display 68 also shows the maximum possible time to destination possible with the computed plans available. If a later arrival was required, a re-plan would be carried out. Delta plan data shows status for fuel and schedule ahead or behind the current optimal plan. Negative numbers mean less fuel or early compared to plan, positive numbers mean more fuel or late compared to plan, and typically trade-off in opposite directions (slowing down to save fuel makes the train late and conversely).

At all times these displays 68 gives the operator a snapshot of where he stands with respect to the currently instituted driving plan. This display is for illustrative purpose only as there are many other ways of displaying/conveying this information to the operator and/or dispatch. Towards this end, the information disclosed above could be intermixed to provide a display different than the ones disclosed.

Other features that may be included in the present invention include, but are not limited to, allowing for the generating of data logs and reports. This information may be stored on the train and downloaded to an off-board system at some point in time. The downloads may occur via manual and/or wireless transmission. This information may also be viewable by the operator via the locomotive display. The data may include such information as, but not limited to, operator inputs, time system is operational, fuel saved, fuel imbalance across locomotives in the train, train journey off course, system diagnostic issues such as if GPS sensor is malfunctioning.

Since trip plans must also take into consideration allowable crew operation time, the present invention may take such information into consideration as a trip is planned. For example, if the maximum time a crew may operate is eight hours, then the trip shall be fashioned to include stopping location for a new crew to take the place of the present crew. Such specified stopping locations may include, but are not limited to rail yards, meet/pass locations, etc. If, as the trip progresses, the trip time may be exceeded, the present invention may be overridden by the operator to meet criteria as determined by the operator. Ultimately, regardless of the operating conditions of the train, such as but not limited to high load, low speed, train stretch conditions, etc., the operator remains in control to command a speed and/or operating condition of the train.

Using the present invention, the train may operate in a plurality of operations. In one operational concept, the present invention may provide commands for commanding propulsion, dynamic braking. The operator then handles all other train functions. In another operational concept, the present invention may provide commands for commanding propulsion only. The operator then handles dynamic braking and all other train functions. In yet another operational concept, the present invention may provide commands for commanding propulsion, dynamic braking and application of the airbrake. The operator then handles all other train functions.

The present invention may also be used by notify the operator of upcoming items of interest of actions to be taken. Specifically, the forecasting logic of the present invention, the continuous corrections and re-planning to the optimized trip plan, the track database, the operator can be notified of upcoming crossings, signals, grade changes, brake actions, sidings, rail yards, fuel stations, etc. This notification may occur audibly and/or through the operator interface.

Specifically using the physics based planning model, train set-up information, on-board track database, on-board operating rules, location determination system, real-time closed loop power/brake control, and sensor feedback, the system shall present and/or notify the operator of required actions. The notification can be visual and/or audible. Examples include notifying of crossings that require the operator activate the locomotive horn and/or bell, notifying of "silent" crossings that do not require the operator activate the locomotive horn or bell.

In another exemplary embodiment, using the physics based planning model discussed above, train set-up information, on-board track database, on-board operating rules, location determination system, real-time closed power/brake control, and sensor feedback, the present invention may present the operator information (e.g. a gauge on display) that allows the operator to see when the train will arrive at various locations as illustrated in FIG. 9. The system shall allow the operator to adjust the trip plan (target arrival time). This information (actual estimated arrival time or information needed to derive off-board) can also be communicated to the dispatch center to allow the dispatcher or dispatch system to adjust the target arrival times. This allows the system to quickly adjust and optimize for the appropriate target function (for example trading off speed and fuel usage).

Based on the information provided above, exemplary embodiments of the invention may be used to determine a location of the train 31 on a track, step 18. A determination of the track characteristic may also be accomplished, such as by using the train parameter estimator 65. A trip plan may be created based on the location of the train, the characteristic of the track, and an operating condition of at least one locomotive of the train. Furthermore, an optimal power requirement may be communicated to train wherein the train operator may be directed to a locomotive, locomotive consist and/or train in accordance with the optimal power, such as through the wireless communication system 47. In another example instead of directing the train operator, the train 31, locomotive consist 18, and/or locomotive may be automatically operated based on the optimal power setting.

Additionally a method may also involve determining a power setting, or power commands 14, for the locomotive consist 18 based on the trip plan. The locomotive consist 18 is then operated at the power setting. Operating parameters of the train and/or locomotive consist may be collected, such as but not limited to actual speed of the train, actual power setting of the locomotive consist, and a location of the train. At least one of these parameters can be compared to the power setting the locomotive consist is commanded to operated at.

In another embodiment, a method may involve determining operational parameters 62 of the train and/or locomotive consist. A desired operational parameter is determined based on determined operational parameters. The determined parameter is compared to the operational parameter. If a difference is detected, the trip plan is adjusted, step 24.

Another embodiment may entail a method where a location of the train 31 on the track 34 is determined. A characteristic of the track 34 is also determined. A trip plan, or drive plan, is developed, or generated in order to minimize fuel consumption. The trip plan may be generated based on the location of the train, the characteristic of the track, and/or the operating condition of the locomotive consist 18 and/or train 31. In a similar method, once a location of the train is determined on the track and a characteristic of the track is known, propulsion control and/or notch commands are provided to minimize fuel consumption.

What is claimed is:

1. A method for operating a first train having one or more locomotive consists with each locomotive consist comprising one or more locomotives, the method comprising:

receiving route data and train data, wherein the route data includes data relating to one or more characteristics of a track on which the first train is to travel along a route and data relating to at least one speed limit along the route, and wherein the train data relates to one or more characteristics of the train;

creating a trip plan onboard the first train at any time during travel of the train along the route, wherein the trip plan is created at a first point along the route based on the received data and covers at least a segment of the route extending to a second point further along the route than the first point, the trip plan designating operational settings of the first train as a function of at least one of distance or time along the route;

automatically controlling the first train according to the trip plan as the first train travels along the route segment, said trip plan being configured for increasing efficiency of the first train by at least one of reducing fuel use of the first train or reducing emissions produced by the first train along the segment of the route;

measuring actual efficiency of the train during travel of the first train according to the trip plan; and updating the trip plan during travel of the first train based on the actual efficiency that is measured.

2. The method of claim 1 further comprising revising the trip plan based on at least one of new route data or train data received as the first train travels along the route.

3. The method of claim 2 wherein the trip plan is further created based on current operational information of the first train, and wherein the trip plan is revised into a revised trip plan based on new or updated current operational information of the first train as the first train travels along the route.

4. The method of claim 3 wherein creating the trip plan and revising the trip plan further comprises factoring in environmental conditions into the revised trip plan.

5. The method of claim 1 further comprising manually limiting a speed of the first train.

6. The method of claim 1 further comprising creating separate trip plans for each of a plurality of segments of the route, wherein at least one of the multiple segments is determined by a natural location along the trip, a siding where a meet and pass may occur, a yard siding, or a waypoint.

7. The method of claim 6 further comprising combining trip plan optimization of the separate trip plans created for the plurality of route segments.

8. The method of claim 1 further comprising implementing train handling rules to control a power setting of the one or more locomotive consists to achieve a target speed.

9. The method of claim 1 further comprising determining a power setting for each locomotive in the one or more locomotive consists to optimize a train speed based on the trip plan and a location of the first train.

10. The method of claim 1 further comprising determining several trip plans that include the trip plan for the at least a segment of the route and presenting the several trip plans to a user to allow the user to select a trip plan to execute.

11. The method of claim 1 wherein the user may decide when to control at least one of a propulsion system and braking system of the first train.

12. The method of claim 1 wherein the trip plan includes a slack time period based on at least one of a confidence or a probability of occurrence of an unplanned delay in the trip plan.

13. The method according to claim 1 further comprising updating the trip plan based on a predetermined plan parameter, wherein the plan parameter is at least one of a track condition, a request by dispatch, a change in conditions of the one or more locomotives, track speed limits, or operator input.

14. The method according to claim 1, wherein creating the trip plan comprises factoring in arrival time management.

15. The method according to claim 1, further comprising communicating information related to at least one of the trip plan an updated trip plan to an operator.

16. The method according to claim 1, further comprising logging and reporting performance of the first train versus the trip plan.

17. The method according to claim 1, further comprising using the trip plan to coach an operator of the first train.

18. The method according to claim 1, further comprising:
communicating an optimal power requirement; and
operating the first train or a locomotive or locomotive consist in the first train in accordance with the optimal power requirement.

19. The method according to claim 18, further comprising directing an operator to operate at least one of the train, the locomotive consist, or the one or more locomotives in the first train in accordance with the optimal power requirement.

20. The method according to claim 1, further comprising:
communicating an optimal throttle setting; and
automatically operating at least one of the first train, the locomotive consist, or the one or more locomotives in accordance with the optimal throttle setting.

21. The method according to claim 1, wherein the trip plan comprises a plurality of power settings for the first train, expressed as a function of at least one of distance or time along the route.

22. The method of claim 1, wherein the trip plan is configured for reducing the emissions produced by the first train.

23. The method of claim 1, further comprising receiving a train-to-train communication from a separate, second train as the first train is traveling according to the trip plan and revising the trip plan of the first train based on the train-to-train communication received from the second train.

24. The method of claim 23, wherein the train-to-train communication notifies the first train that the second train is behind schedule and the trip plan is revised to coordinate movement of the first train with movement of the second train that is behind schedule.

25. The method of claim 1, wherein the trip plan is created to increase the efficiency of the train by reducing at least one of fuel used or emissions produced as an objective of the trip plan, and further comprising changing the objective of the trip plan as a function of distance of the train to a destination location of the trip.

26. The method of claim 1, wherein creating the trip plan includes examining previously determined trip plans and selecting the trip plan from the previously determined trip plans based on at least one of a comparison between a current train configuration and previous train configurations associated with the previously determined trip plans, a comparison between the route of the train and previously traveled routes associated with the previously determined trip plans, or a comparison between current environmental conditions and previous environmental conditions associated with the previously determined trip plans.

27. The method of claim 1, wherein the trip plan is created using a designated time period that a current crew of operators the train is allowed to operate onboard the train, the trip plan created to include one or more stops of the train to allow the current crew of operators to be replaced with a replacement crew of operators.

28. The method of claim 1, further comprising determining several trip plans that include the trip plan that is communicated to the train and presenting the several trip plans to an operator disposed onboard the train to allow the operator to select which of the several trip plans is to be used to control operations of the train.

* * * * *